United States Patent [19]

Mletzko et al.

[11] 4,333,153
[45] Jun. 1, 1982

[54] SCANNING AND CONTROL SYSTEM FOR ELECTRO OPTICAL PRINTER

[75] Inventors: Alfred E. Mletzko, Woodbury; Andrew P. Gonet, Stamford, both of Conn.

[73] Assignee: Eltra Corporation, Toledo, Ohio

[21] Appl. No.: 97,281

[22] Filed: Nov. 26, 1979

[51] Int. Cl.³ .............................................. G06F 3/14
[52] U.S. Cl. ..................................... 364/523; 364/900
[58] Field of Search ................. 364/519, 523, 900; 354/6, 15

[56] References Cited

U.S. PATENT DOCUMENTS

| | | | |
|---|---|---|---|
| 3,664,737 | 5/1972 | Lipp | 354/6 X |
| 3,995,147 | 11/1976 | Sinnott et al. | 364/523 |
| 4,029,947 | 6/1977 | Evans et al. | 364/523 X |
| 4,231,096 | 10/1980 | Hansen et al. | 364/523 |

*Primary Examiner*—Jerry Smith
*Attorney, Agent, or Firm*—Joel I. Rosenblatt

[57] ABSTRACT

An electrophotographic typesetting system having a raster scanning means including means for directing a beam of modulated radiation across an imaging surface, means for providing relative motion between said beam and an imaging surface to produce a succession of raster lines, and forming a plurality of characters on said surface, including means for providing first digital data defining the identity and location of characters, font storage means providing data defining the contour of a plurality of characters with respect to a normalized encoded set of first and second coordinates, data processing means connected to said first and second digital data for producing third digital data defining the character boundaries intersecting a raster line, means for modulating said beam to change the state of the beam from a first state to a second state at a first intersection and to reverse the state of the beam at a successive intersection, forming said characters on said surface, said data processing means including a raster line store for storing said third digital data, and a controller for controlling at least a part of said system and having means for interogating said raster line store and inhibiting said data processing means from transmitting said third digital data in response to an incompletely filled line store.

47 Claims, 28 Drawing Figures

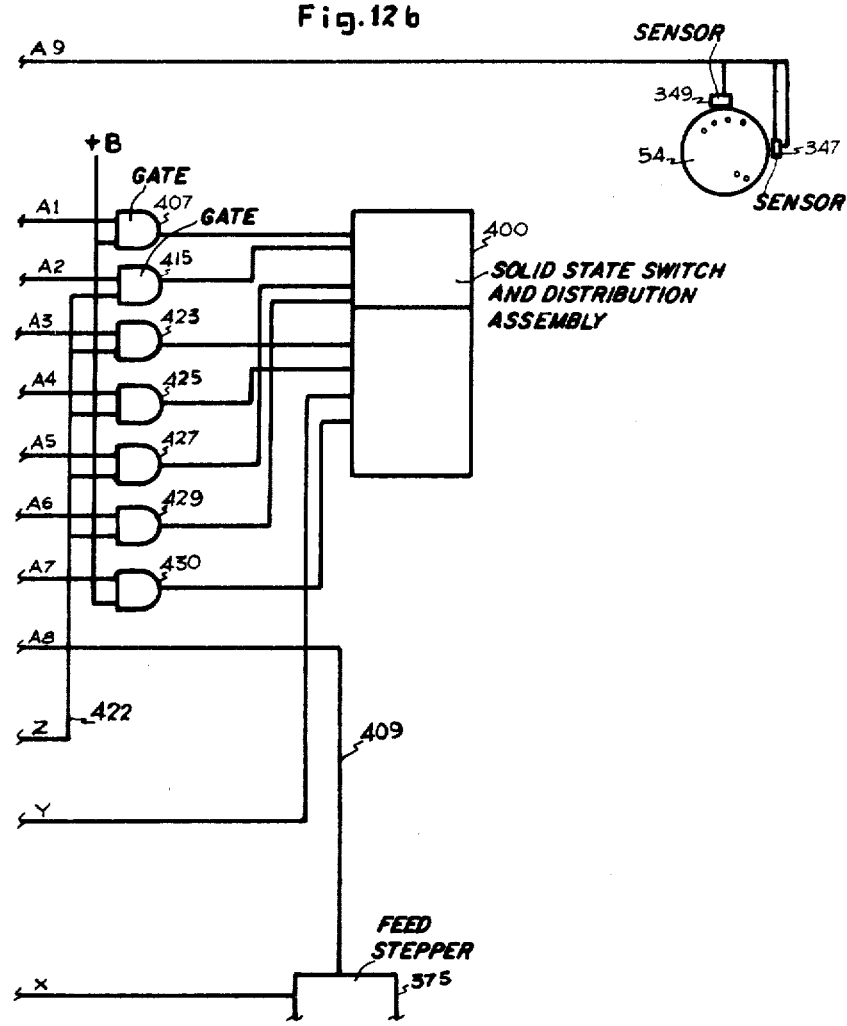

SCANNING AND CONTROL SYSTEM FOR ELECTRO OPTICAL PRINTER

CROSS REFERENCE TO RELATED APPLICATIONS

This application is related to commonly owned U.S. Pat. No. 4,231,096; for "DIGITAL TYPESETTER"; U.S. Pat. No. 4,270,859 for "ELECTROPHOTOGRAPHIC APPARATUS FOR PROVIDING DRY DEVELOPED OUTPUT FROM A TYPESETTER"; U.S. application 095,894 filed Nov. 19, 1979 for "OPTICAL SYSTEM FOR ELECTRO OPTICAL SCANNER", now abandoned, and U.S. Pat. No. 4,277,154 "OPTICAL SYSTEM FOR ELECTRICAL OPTICAL SCANNER".

FIELD OF THE INVENTION

This invention is in the field of electro optical typesetters and particularly those employing a normalized digital encoded font for generating characters in a raster scanning device.

BACKGROUND OF THE INVENTION

The present invention relates to a control system for a digital typesetter for imaging graphic quality characters of a digital font stored in machine memory.

A digital typesetter images typographic quality characters coded in digital form and stored on a medium such as a magnetic tape, drum or rigid or floppy disc. Such digital typesetters are normally provided with a cathode ray tube (CRT) or laser beam imaging system for writing characters onto photographic film or charged photosensitive surface. In the case of digital CRT typesetters, successive characters are each completely imaged, one at a time by a CRT beam. Normally, each character is built up from a series of vertical strokes which commence from the left side bearing of the character and proceed successively to the right side bearing. Once a character has been completely stroked, the CRT beam is moved to the left side bearing position of the next successive character to form the next character.

Where a laser beam rather than a CRT imaging system is used to reproduce characters, a modulated one dimensional scanning beam has generally been used. The character writing beam is swept across the entire width of the output film or paper in a single line passing through many characters and the print medium is moved in a direction transverse to the direction of the scan line. While such a laser-based imaging system offers advantages over a cathode ray tube system, such a system requires computation of the beam switch points to turn the scanning beam on and off with sufficient speed to keep up with the scanner on a real time basis. In order to overcome this disadvantage, the machine employs a single type size to be set. In this way, the encoded character information may be used directly without scaling, which would require extensive computation. The disadvantage of this arrangement is that an entire font of characters must be stored in the machine for each of the desired type sizes. This results in excessive use of storage space within the machine or requires that the machine be repeatedly "dressed" with a different digitally encoded font each time a different type size, or a different font are to be used.

Within these prior art systems, an imaging surface is carried on a moving support surface such that the beam of modulated light is scanned across the surface in a direction substantially transverse to its direction of travel resulting the well-known raster type scan. As in the known prior art, the imaging surface may be located on a belt which travels between charging stations. Within known prior art devices, the printing operation from charging to stripping takes place in one cycle of the medium.

Other prior art devices place the imaging surface on a drum, either in the form of a paper sheet placed on the drum, or where the photosensitive surface is part of the drum and the image is subsequently transferred to a sheet. As in the case of the belt, the reproduction process takes place in one cycle of the drum wherein the photosensitive surface is changed, imaged, developed and stripped.

These prior art systems typically employ timing means such as marks located on the belt or on the drum to synchronize the operation of the reproduction stations to the position of the drum or the position of the belt. These timing signals are then used to control the operating stations of the recording unit and to synchronize the output of data with the position of drum or belt.

SUMMARY OF THE INVENTION

It is the object of the invention to provide a control system for a digital typesetter which provides video in the form of digital data signals to modulate a laser beam which is swept across a light sensitive surface to produce multi point size typographical characters of a typesetting quality from a single normalized digital master font. As set forth in the aforesaid U.S. Pat. No. 4,231,096, a series of characters representing a font is stored in digitized form on a storage medium. Each of the digitized characters is coded on a normalized encoded grid which is then scaled by the apparatus to produce characters of varying size.

In the phototypesetting system, an electronic data processing system receives first digital data defining the identity, form, size and placement of characters to be typeset; receives second digital data defining the contour of each character to be typeset with respect to the normalized encoded set and produces third digital data defining the boundaries of a plurality of characters intersecting a raster scan line.

The first digital data defining the identity, form, size and placement of the characters to be typeset may originate from a computer system (with the typesetter on line) or from a storage medium such as a floppy disk. The second digital data is preferably stored on a magnetic record, such as a floppy disk.

The normalized encoded set of characters is defined with respct to (1) the character outline start points and (2) the dx and dy coordinates for the vectors representing the outline of the character.

Third digital data for at least the portion of the raster line extending the width of several characters is temporarily stored in a raster line storage buffer. A character imaging device connected to the line storage buffer is provided to image the successive raster lines on a print medium. Drive means are also provided for moving the print medium in a direction transverse to the direction of the raster scan line.

For a description of the device which may be used to image the characters, references may be made to the aforementioned application Ser. No. 37,698 and assigned to the common assignee.

In a laser recording system, the raster line extends substantially the width of the print medium which may be at least the size of conventional written page. The print medium may comprise paper which can be used in a conventional way for paste-up or to make office copies, or the print medium may comprise a printing plate so that printed copies may be made directly from the typesetter output.

Preferably, the raster line extends horizontally on the print medium; i.e. parallel to the lines of type. The raster line may be created by a scanning device, such as a laser recorder having a means for generating a scanning beam across the print medium in a scan line. The scanning beam is switched on and off in response to the line storage buffer, as the beam is scanned across the print medium.

The manner in which the second digital data defines the contour of each character of a font is described in U.S. Pat. No. 4,231,096. Essentially, this second digital data comprises digital numbers defining the X and Y coordinates of the start points of character outlines and digital numbers defining the length and direction of a plurality of straight line vectors extending successively along the character outlines from the start points. The length and direction of each vector is represented by the first coordinate distance $\Delta X$ and the second coordinate distance $\Delta Y$ from one end of the vector to the other.

The digital numbers defining the vectors are arranged such that the vectors of an entire string are successivly defined before defining the vectors of another string. In addition, the second digital data includes further digital numbers, associated with the digital numbers defining the coordinates of each start point, which constitute the starting address of the digital numbers defining the vectors of the associated string. In this way, a single vector string may be addressed from a plurality of start points within a font.

The electronic data processing system used in the typesetter preferably includes a random access memory for storing fourth digital data, a data management subsystem for receiving and storing the first and second digital data and producing and storing the fourth digital data in the random access memory, and an outline converter subsystem for receiving the fourth digital data from the random access memory and computing from this fourth digital data, the third digital data defining the character boundaries intersecting the raster line. The fourth digital data is stored in a line storage buffer.

The line storage buffer preferably includes two line buffers, each of which may be formed of a plurality of memory elements each storing a single binary digit corresponding to a respective, unique raster point along the raster line. The binary digits in the first line buffer may thus represent positions on the scan line at which the scanning beam is to be switched on and the binary digits in the second line buffer may represent the positions on the scan line in which the scanning beam is to be switched off.

The line storage buffer may also include a third line buffer, which may be identical to the other two. The binary digits in this third line buffer may thus represent the positions of the scan line at which the beam on/off switching is to be reversed, thus effecting a color reversal for either an entire page or a rectilinear section thereof.

A phototypesetting unit using a laser imaging device is distinct for several reasons from other laser imaging devices.

A typesetting unit requires a high quality output for further reproduction and duplication. Ordinarily in the printing process, the output of the recorder is Photographed and an offset master is produced which is used to produce a number of copies. The characters formed on the imaging surface by the phototypesetting unit must be of the quality or close to the quality of letter press made with conventional lead type.

As stated above, the line buffer corresponding to the width of a raster across the page is loaded with data. The location of the beam as it is driven across the page in the raster scan direction must coincide exactly with each of the data bits to produce this quality. As the beam is driven to each successive data point across the imaging surface, the data in the raster scan must be provided to the beam modulator, so that the beam is modulated when it is exactly at that precise data point on the imaging surface, corresponding to the data in that line buffer.

For example, a line buffer as used in this device may have 6,146 bits for an 8½ inch scan or 7,953 bits for an 11 inch scan.

As the beam is driven across the width of the page, in the case of the 11 inch scan, each of the 7,953 bits must be provided to the beam modulator at the precise time that the beam is at the imaging point corresponding to that buffer bit location.

This problem is complicated even further due to the normalized encoded nature of the font information. As stated above, the characters are encoded in a normalized grid and typically are not used in the exact same size as they are encoded in the digital font data base. Typically, the normalized encoded data is expanded or contracted to form the needed point size letters on the imaging surface. Where the data base for each of the digitally encoded characters are used to compute the intersections of the character boundaries with the raster line, the outline converter system or the output data system (ODS) uses the first and second digital data, the second digital data being the data base for each digitally encoded character and computes the intersection of the character boundaries with a raster line. These character boundary locations are then provided to the line buffer which is then read out to modulate the laser beam.

As is typical in the typesetting function, the arrangement of characters on a line may vary as to size and placement. Prior to imaging the characters with a scanning beam, the character intersections with each raster line are computed from the digitally encoded fonts as well as from the input data describing the form, identity, size, and placement of characters to be typset. The computation time will vary depending on the complexity of the finished text.

In computing these intersections, for a typesetter, the recording device may need to be intermittently driven as where the output data system is not ready to provide the data for the next line scan.

A means for driving the beam across the page which may be a galvo and galvo drive may drive the beam at a speed in advance of the computing capability of the output data system. In ths case, it is necessary for a system controller to synchronize with recording system with the data processing rate without sacrificing the integrity and reliability of the beam scanning means.

Because of the nature of beam scanning devices, interruption of the beam scanning means would increase any inaccuracy in the repeatability of the beam scanner relative to the data output. This would be most likely after interruption, during the restart period of the beam and during the period when the beam is stopped requiring precise external positioning controls. To optimize repeatability, the system controller must allow the beam scanner to remain in a free running state so its operation is uninterupted and its repeatability and reliability is maximized. In this way, the controller can maximize the synchronization of the output data system within the character generator equipment used to compute the character intersection points with the location of the beam as it is swept across the page.

This feature is especially important in typesetting where the integrity of the reproduced character and its impression on the eye is compared with the impression made by a metal type piece and where the normalized encoded font data may be enlarged to form large point size letters, emphasizing any irregularities present in the encoded character outline.

In accordance with this embodiment, the controller synchronizes the readout of intersection points for each of the characters with the data point locations in the raster sweep locus of the beam. The system accomplishes this by providing means for sensing when the ODS has completed filling the output buffer with video data for a raster line and is ready to or has commenced to fill the buffer for the next successive raster line. The appropriate handshaking signals are received from the output data system (ODS) responsive to controller interrogative signals. The ODS which produces data flags when the buffers are filled with data for a raster line. These flags cause a reflection back to the controller of its own interrogative signals indicating the state of the ODS. The controller then is made responsive to the conditions of these flags so that the recorder can be synchronized with the data output rate.

The controller then comprises the means used for selectively transmitting handshaking signals to the ODS at selected stages of the system operation and for the described purposes.

Additionally, in phototypesetting, the size of the unit is important. In most light sensitive imaging systems, the imaging surface is either carried on a drum or a belt or made an integral part of the belt or drum. For the sake of copy reproduction output speed, the imaging surface is typically prepared, imaged and developed within one cycle or revolution of the belt or the drum. A series of timing marks placed on the drum mechanically integrate the timing of the output data system with the position of the drum such that the imaging operating stations such as charging, imaging, developing and stripping are activated when the drum is at the proper rotational angle.

In this system, a drum is used to support an imaging sheet such as the zinc oxide paper as may be seen in the U.S. Pat. No. 4,270,859. As described in that copending application, the reproduction process utilizes a plurality of drum cycles to complete the charging, imaging, scanning and developing process. By utilizing a plurality of cycles than one cycle, the drum diameter can then be reduced as well as the size of the surrounding unit. For example, where the paper may be 17 inches long and the drum would then be of a circumference slightly in excess of 17 inches. By minimizing the size of the drum to a circumferential length slightly in excess of size of the paper, the drum diameter can be reduced as the size of the package surrounding the drum can be made additionally compact. However, it is necessary to drive the drum through a number of successive cycles to complete the imaging process.

As disclosed in the aforesaid patent application, the drum in one cycle is loaded with the imaging paper and charged by a corotron device. In a second successive cycle, it is driven past the exposure station where a latent image is formed corresponding to the characters to be typeset. As in typesetting; where the page format and the type size may vary the computation time needed to compute the character intersections will also vary. The drum cannot be driven at a uniform rate as in conventional imaging devices and part of the latent image cannot be developed while the latent image for the remainder of the typeset page is being scanned. The drum must be cycled completely through the scanning cycle before it is recycled through the developing cycle. It is driven through a third successive cycle where the paper is presented to the developing and stripping stations and the finished output is removed from the drum.

Within this multicycle operation, the controller must provide the appropriate control signals at the appropriate drum positions and in synchronism with the data from the ODS.

The controller accomplishes this by functionally integrating the beam sweep, the drum position, and the reproduction operating stations with the generation of output data by a control sequence comprising a combination of control signals and control functions.

The controller uses a system of timing marks, and a counting scheme which provides an accurate and reliable indication of the rotational angle of the drum. The control system responsive to these timing indications then actuates the proper stations in the drum and drives the drum accordingly until the finished copy is produced.

The mark may be termed timing marks and understood as a subset of the master timing means comprising the master clock and associated signal generating means used to produce step and sync signals responsive to the master timing means and to drive the system. The timing marks are a position means used to indicate the position of the image support means such as the drum and to time the on/off periods of the reproducing stations. The marks are used as timing means by being indicative of position. The position is in turn responsive to the master timing means.

In particular, a minimum number of timing marks are placed on the drum limited to a home position for the drum start and an additional plurality of timing marks for each of the operating stations in the system.

The home position mark is a pin which positions the drum for receiving the copy sheet. Additional means, shown as pins, are provided for the charging, exposing, prewet, developing and the stripping stations as well as for timing the indication of a paper jam within the machine.

The controller responsive to these timing indications then controls the operation of the reproduction stations, and drives the drum with varying speeds through the plurality of operating cycles to minimize the time for reproducing the finished copy.

The beam scanning means as used on this system is a galvo driven mirror. A feedback galvo drive drives the galvo in successive raster lines across the page. In accordance with a feature of the invention, a means such as an input resistance is provided for defining the extent of a ramp signal used for driving the galvo. The resistance means contains a fixed resistance and a variable resistance. The fixed resistance has a value substantially that required to produce the necessary ramp output.

The variable resistance is provided to compensate for any out of tolerance conditions which may occur in the galvo and its drive means. The variable resistance has a range matched to the tolerance range of at least one characteristic of the beam scanning means so that it may be adjusted to compensate for that characteristic to produce a ramp signal corresponding to the desired scan path. As it is necessary to provide some compensating resistance means, this device minimizes this variable resistance so that the effect of any change due to the variable resistance on the total resistance used to define the ramp, is minimized.

To further control the beam scan path, a feedback position signal, from the galvo drive is calibrated to a predetermined standard so the system effect of variations in the galvo feedback position signal between separate galvo drives will be reduced.

The galvo position signal is calibrated before it is summed with the galvo ramp drive signal. The result of the summated signals is an error signal used to drive the galvo. By calibrating the galvo position signal, the galvo drive means input resistance can be reduced, further reducing the effect of any variations in the variable input resistance.

Additionally, a voltage offset means is provided to eliminate any erroneous offset in the galvo position signal and to accurately zero the galvo position signal. The offset means is provided with an output resistance substantially that of the output resistance of the position signal so the relationship between the galvo zero position error and the output voltage of the offset means is substantially the same. A single galvo unit having a galvo position signal calibrating and including means to calibrate the position signal zero offset may be made into a single replaceable unit so a galvo unit can be calibrated in the laboratory avoiding costly, and less reliable field calibrations.

In this way, the ramp amplifier and the beam sweep path is controlled to a high degree of accuracy. Even though changes may occur in the variable resistance, as the size of that resistance is minimized, the reliability of the sweep of the beam across the page is sufficient such that the location of the beam on the page can be corrolated with respect to the series of sync pulses provided by the galvo ramp generator, each sync pulse indicating the movement of the beam to a new raster line.

In most prior art devices, the position of the beam is tracked as it is swept across a page, as by an optical grating. The data output rate is then tied to the tracking signals and the data rate is controlled by the beam's movement and position.

In this device, the data output rate and timing is controlled separately from the beam's position as it moves through its scan locus. A master timing means, provides a master timing signal clocking the data rate and initiating the start of the data transmission for each line. A means is provided for synchronizing the start of date for each line with the start of the line scan beam position.

In this manner, additional and costly beam tracking means are avoided and the beam's position can be accurately correlated to the data output by a single driving means. In this system by limiting the variable resistance at the galvo drive input, a higher degree of accuracy is obtained so that the sweep length of the galvo can be controlled for the approximately 6000 bits across a 8½" page without additional control apparatus.

The controller sends the sync pulse to the ODS indicating that galvo is ready to image the next successive raster line. Responsive to a reflected signal, the recorder control system then will provide a clocking signal to the ODS to clock the video out of the ODS. In accordance with the invention, if the ODS computation has not been completed, for all the character intersections for the next raster line, the controller responsively inhibits the read clock provided to the ODS so that no data is transmitted until the output ODS data system is ready. The galvo is allowed to continually run without interruptions to avoid irregularities in the beam sweep and the necessity for repositioning the beam at restart after each interruption.

In accordance with another feature of the invention, the controller includes a means for disabling the video received from the ODS and preventing it from reaching the beam modulator. This feature insures a predetermined margin is provided and that every typeset page is consistently formatted in accordance with standard typesetting techniques.

A further feature is concerned with the application of toner to latent image. The control system times the toner application to the paper after a predetermined portion of the leading edge has passed the developer station, assuring that the developer does not reach the uncovered drum surface nor pass between the paper and the drum, requiring the machine to be dismantled and the drum cleaned before the next copy can be made.

In accordance with another feature of this device, a system master digital clock is part of a master timing means including step and sync signal means. The clock controls the generation of the ramp. The ramp amplitude provides phase timing points for the sync and provides a galvo drive signal for sweeping the beam across the imaging surface.

As part of the timing means are a set of position pins located on the drum used to support the imaging surface. As the drum revolves under the control of the master clock, the rotating pins cooperate with sensors arranged around the drum to activate the reproduction processing stations.

The rotation of the drum, and the occurrence of these timing signals derived from the pins are controlled by the ramp signal and ultimately from the system master clock source.

The step pulse, used to step the drum is derived from the master clock and coincident to the flyback portion of the ramp signal. It is provided through the controller logic to the drum stepper driver during the scan cycle.

The sync pulse is derived from the ramp by slicing the ramp with reference to a stable reference voltage level. As the ramp is derived from a digital clock, its period is substantially constant and slicing the ramp produces a periodic waveform at a predetermined phase of the ramp. This waveform indicative of the ramp phase is then used as the sync pulse.

In the slicer a capacitor filter is employed to reduce noise adding to the stability and reliability of the sync pulse, contributing to its usefulness in controlling the sweep length termination point and the precise location of each data point on a raster line.

The use of a master clock to control the ramp and the beam sweep and to synchronize the movement of the beam across a raster line with the motion of the drum and the data allows each data bit to be precisely placed on the imaging surface. It permits the sweep of the beam to be controlled without the need for extra devices such as gratings to locate and position the beam as it moves across the raster line. It further adds to a laser scanning device, used in a phototypesetting unit, where normalized encoded data is displayed in multisize characters on a raster scan.

As an additional feature of the invention, the galvo mirror is repositioned on the galvo motor shaft to be off center so that the most linear portion of the galvo motor characteristic is used, further adding to the reliability and repeatability of the system.

BRIEF DESCRIPTION OF THE DRAWINGS

FIGS. 12 and 12a to 12e is the logic diagram of the controller connected to the character generator output system and the operating devices in the recording unit.

FIGS. 14 and 14a are an expanded time diagram of a portion of the control and data signals of FIGS. 13 and 13a.

DESCRIPTION OF THE INVENTION

As stated earlier, the output data system, (ODS) computes the intersection of a character boundary with a particular raster line. In use of this system, a single raster line will typically intersect a plurality of characters. The resolution along a single raster line may be for the sake of explanation, a thousand units. The ODS then computes the addresses of the raster units intersected by a character outline and provides a signal to an addressable location in a line buffer for those specific unit locations on that raster line. Those buffered signals then command the beam either to be turned on or turned off at the raster line units associated with that buffer location.

Figure 7:
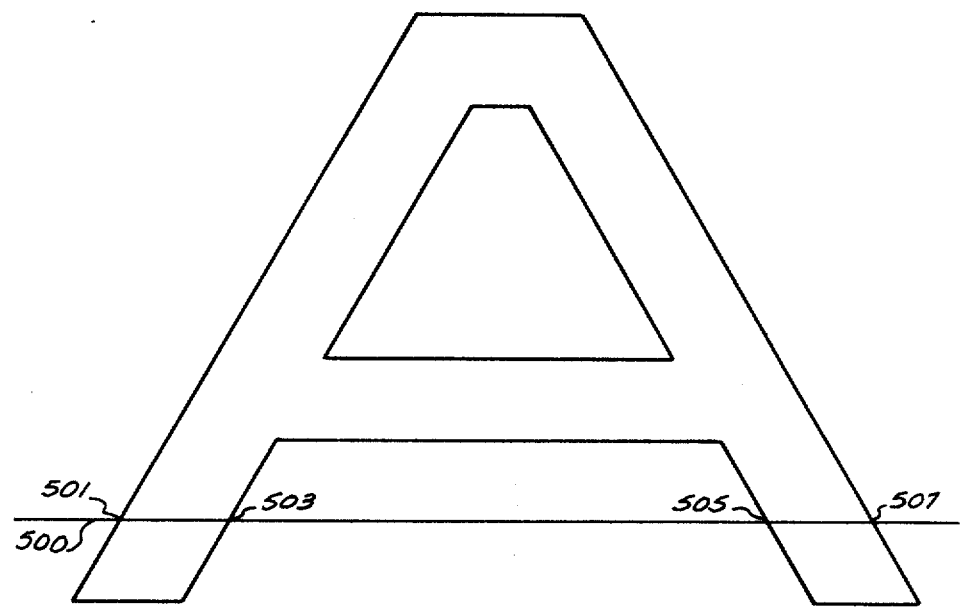
FIG. 7 shows the manner of imaging by turning a beam on and off as it passes through the intersections of a character on a raster line.

By way of example, where an A is displayed on a series of lines, one of the raster lines 500 shown in FIG. 7, the beam may be turned on when it reaches the first and third intersections 501 and 505 of the raster line with the character outline A and then turned off as the beam reaches the second and fourth intersection 503 and 507 of the character outline. The effect would be to produce a positive character by illuminating the area between the character outlines and between intersections 501 and 503 and 505, and 507. This effect would be reversed where intersections 501 and 505 were turn off points and 503 and 507 were turn on points.

The ODS provides a bit to the addressable location in a line buffer system corresponding to the first intersection 501 of the character outline with the raster line and so on.

In accordance with the preferred embodiment, and as described in the aforesaid U.S. Pat. No. 4,231,096 a plurality of line buffers are used with separate buffers being provided for the on the off bits.

The system then starts with normalized encoded characters describing the contour of the character, as the letter A in FIG. 7 and then provides this information in the form of beam switching points along the raster line. The encoding method being completely described in the aforesaid U.S. Pat. No. 4,231,096.

In order to accurately coordinate movement of the beam with the data in the buffer, and to reproduce the contour of the characters with the high quality reproduction required of a typesetting unit, it is necessary to successfully synchronize the operation of the printing unit with the generation of output data so that the printed material appears on the imaging surface, with the exact relationship to the characters described in the font memory data base.

As stated before, the recording unit uses an electrophotographic process with a drum supporting an image surface driven through a complete cycle before a sec ond cycle of the process is begun for selected process steps.

The multicycle recording feature compacts the size of the machine and makes maximum use of the space. For this reason, a drum used for supporting the imaging surface has a circumference approximately that of the length of the imaging surface and with a consequently small diameter so its size is minimized.

Further, the data is provided to the beam modulator at an intermittent rate due to the differing letter size and composition requirements and the resultant computation times.

Accordingly, the recording unit is driven through a complete scanning cycle at varying scanning rates between lines and with intermittent movement of the drum before the latent image is developed.

The invention is now described with reference to the Character Generating System.

Figure 1:
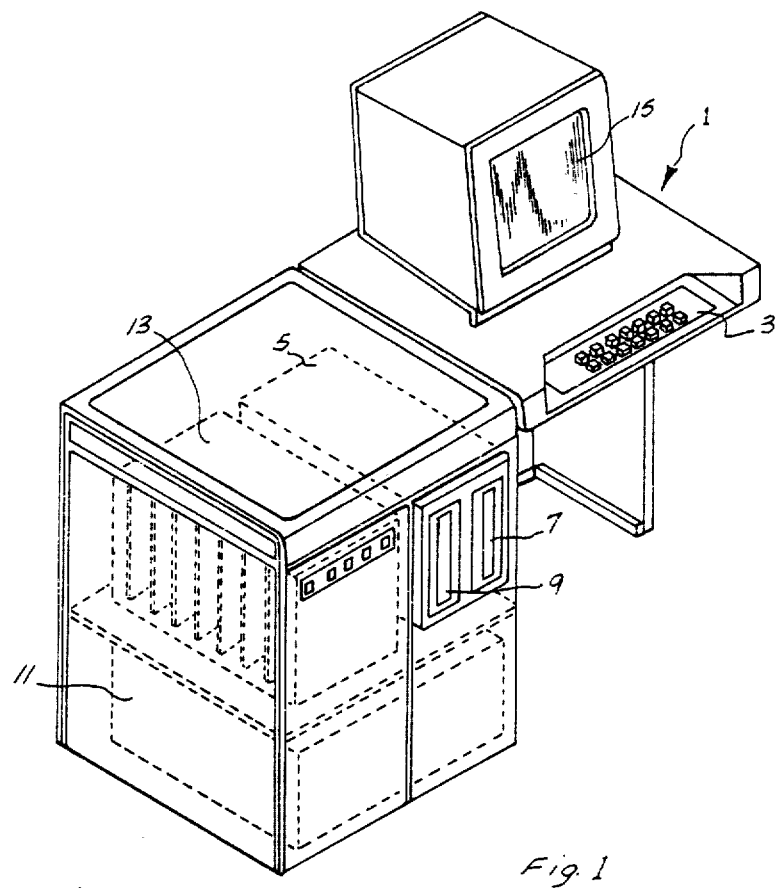
FIGS. 1 & 2 are block diagrams of the overall typesetting unit.

FIG. 1 shows a front view of the keyboard display console indicated generally by numeral 1.

Mounted on the console assembly is a keyboard 3 capable of inputting to the processing system, digital data defining the identity, form, size and placement of characters to be printed. Any other suitable input device such as a paper tape, magnetic tape, disc readers, a computer, or a data transmission channel may be used. The identity of the characters is intended to be the name of each particular character chosen such as upper case "A", lower case "a", upper case "B", numbaral "5"; and the like and given by an ASCII or TTF code. The form designates the shape or font for each character, the amount and direction of slant and the width and the point size of each character. Placement means the coordinate position of the character on the page to be set.

A floppy disc drive 5 may be provided in the system with one disc for example, the disc 7 containing the first digital data while the disc 9 may contain the digital data corresponding to the font information or second digital data. A microcomputer control unit and memory space are contained with the input data subsystem 11.

The output data processing system for computing the points on each raster line at which the laser scanning beam must be turned off and on is contained in the output data processing subsystem 13.

A CRT soft display 15 is shown mounted on top of the keyboard display console, the microprocessor control unit located in the input data system may be used for example to display the information placed into the system by means of the keyboard terminal 3 on CRT 15.

Figure 2:
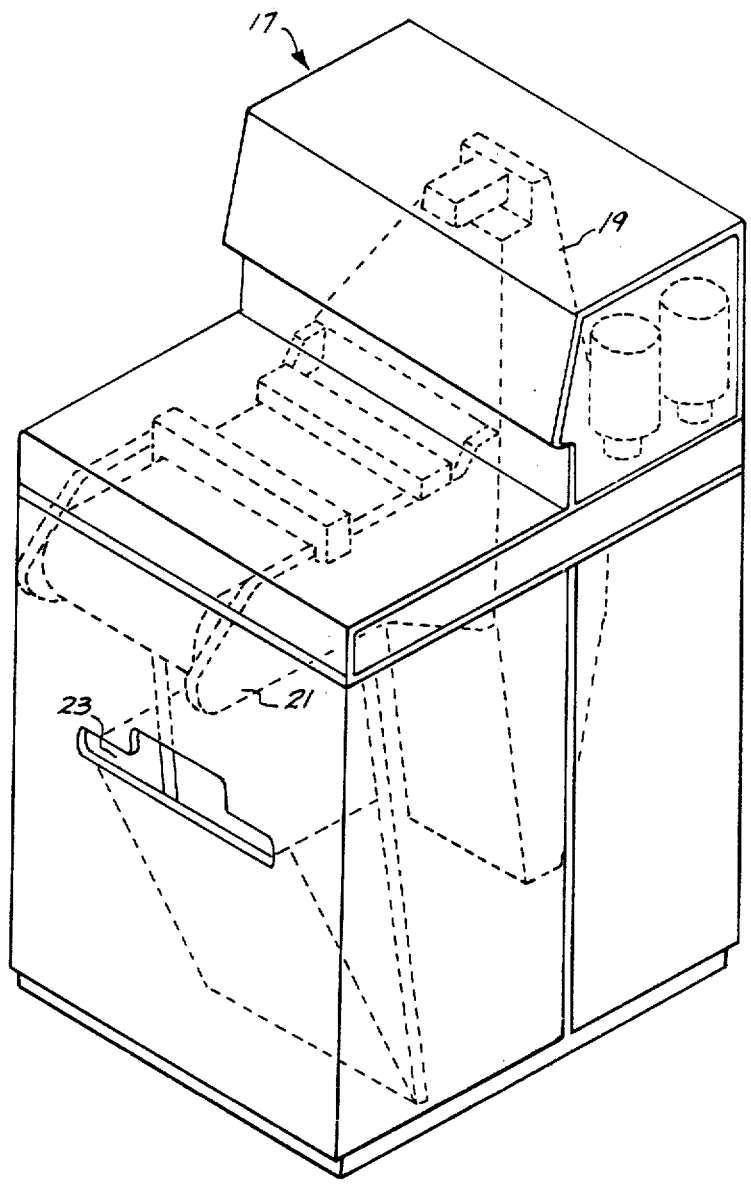
Figure 3:
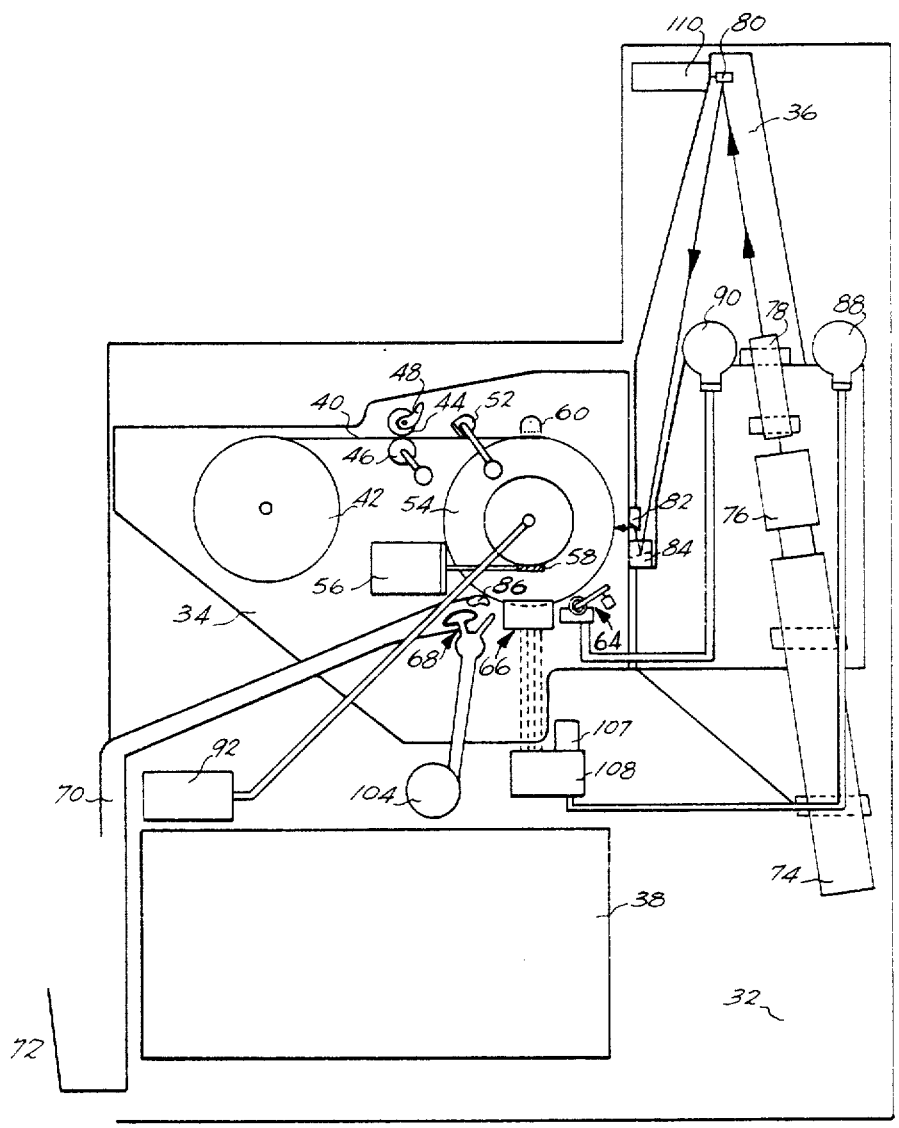
FIG. 3 is a schematic diagram of the recorder unit as shown in FIG. 2.

The recorder console is shown in FIG. 2 and in a schematic view in FIG. 3. As shown in FIG. 2, the recorder console is indicated generally by numeral 17 having an optical support subassembly 19, and a copy material transport 21. A copydelivery slot 23 is provided for receiving the dry finished output of the recorder.

FIG. 3 shows the schematic diagram of the recorder console of FIG. 2 and which is substantially as described in U.S. Pat. No. 4,270,859.

This recorder apparatus as shown in FIG. 3 comprises a frame 32 on which are mounted the paper transport 34 and the optical support assembly 19, as well as power supplies 38. The image receiving medium 40 is supplied from a replaceable web roll 42 and passed through a pair of feed rollers 44 and 46. The upper feed roller 44 is normally spring biased downward against the lower feed roller 46, but may be released by pressing a lever 48. The lower feed roller 46 may be driven by a motor (not shown) to move the web 40 forward.

Figure 4:
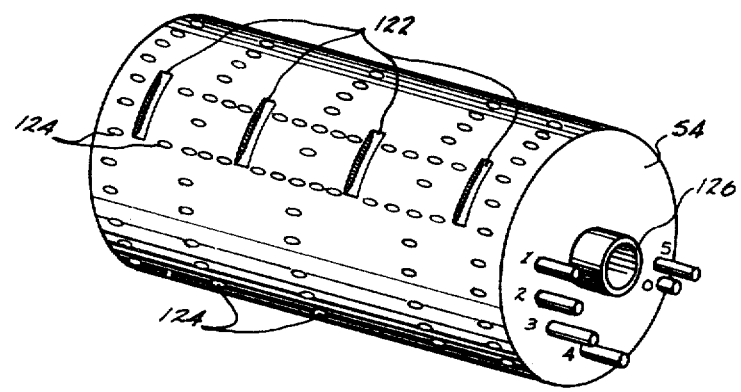
FIG. 4 is a view of the recorder drum and diagram of the optical positioning means.

The web 40 is passed to a cutter 52 which cuts the web into sheets approximately 19 inches in length. These sheets are wrapped around a rotatable drum 54, 21 inches in circumference, and held in place by vacuum applied through apertures 124 in the outer surface of the drum and as shown in FIG. 4.

The drum is driven at the desired speed by a motor 56 acting through a worm gear 58. Surrounding the drum in a clockwise direction are the corotron 60, and exposing system comprising off axis mirrors 82 and 84, laser modulator 76, beam expander 78, and galvo mirror 80, all directing light beam 36 in a scanning path. A prewetting device 64, a developing device 66 and a drying device 68 is provided at the periphery of the drum. The exposing system repeatedly and rapidly scans a beam of light across the width of the paper sheet 40. The light beam is generated by a laser 74 and is switched in response to an electronic control signal by a modulator 76. The modulator may be an acoustical optical modulator or any other suitable modulation device. The beam is passed through a beam expander and objective lens comprised by the optics package 78 and is reflected from a scanning mirror 80 driven through a scanning arc by drive 110. Thereafter, the beam is reflected from a spherical mirror 84 which serves as a field flattener. Finally, the beam is folded and reflected into the horizontal plane by a stationary plane mirror 82.

A prewetting device 64, developing device 66 and the drying device 68, are provided for producing a finished image. As may be seen, the prewetting device is replenished with liquid dispersants from a bottle 90, and the developing device is replenished with toner concentrates from a bottle 88. Finger 86 is provided adjacent the drying device 68 to remove the leading edge of the paper sheet from the drum 54. The developed images passes through chute 70 to basket 72.

Near the lower part of the frame 32 is arranged a vacuum pump 92 connected to draw air from the interior of the drum 54. A blower 104 is connected to supply air to the drying device 68 and a toner recirculating pump 107 and a reservoir 108 are operative to pass liquid toner to and receive liquid toner from the developing device 66.

As stated, the ODS line buffer stores sufficient data to define an entire raster line extending the complete width of the output print medium which may, for example, be at least the size of a conventional typewritten page.

Figure 5:
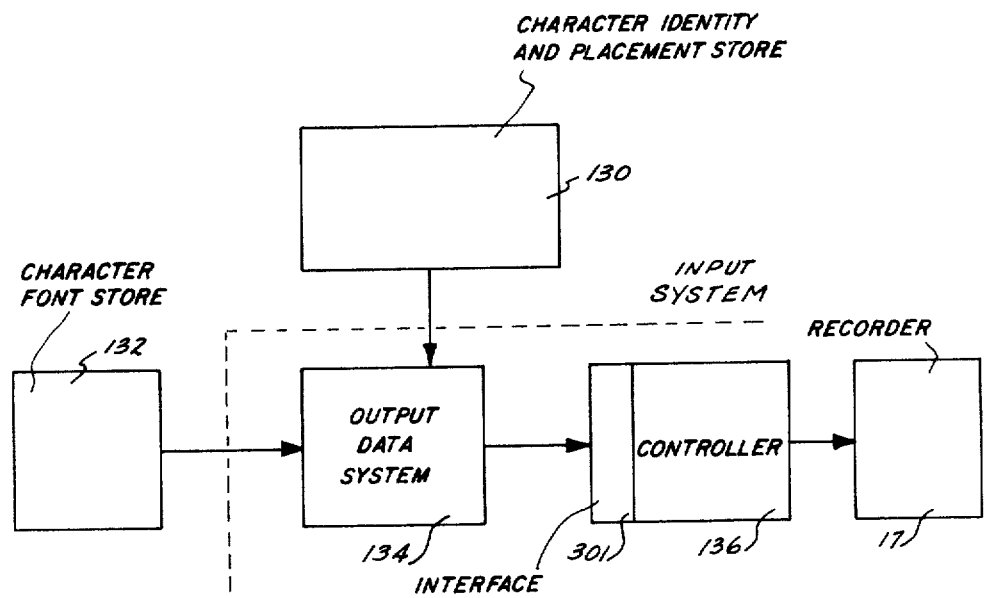
FIG. 5 is a block diagram of the digital phototypesetting unit.
Figure 6:
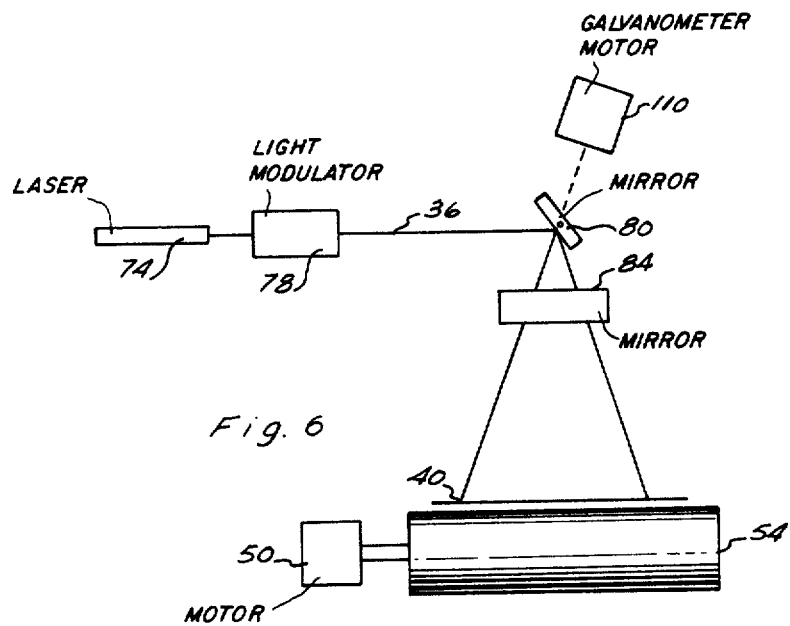
FIG. 6 is a schematic view of the recorder optical path.

Referring now to FIGS. 5 & 6, the information stored in the raster line storage buffer of the ODS 134, is translated into a raster line image by a Character Imaging System including the Controller 136 and recorder 17 connected to the ODS through an interface 301. The Character Imaging System creates an image on a print medium for the particular raster line defined by the information stored in the raster line storage buffer. A drive mechanism is also provided in the Character Imaging System for moving the print medium in a direction transverse to the direction of the imaged raster line. The character font store 132 and the character identity and placement store 130 provide first and second inputs to the output data system 134.

In the preferred embodiment, the Character Imaging System includes a laser source for generating a scanning beam and a movable mirror for moving the scanning beam across the print medium in a scan. As example of one one-dimensional scanner is illustrated in FIG. 6 and generally refers to the imaging system disclosed in applicant's copending application Ser. No. 095,894 filed Nov. 19, 1979 and now abandoned.

Generally, then, it may be seen that the function of the ODS is to convert the first and second digital data received from the input device 130 and the font storage unit 132 into third digital which is sent to the Character Imaging System 136.

The ODS 134 is responsible for computing the horizontal coordinates on the page to be typeset at which the laser scanning beam must be turned on or off for each and every raster line on the page. Its computation is based upon the particular raster line which is required (depth down the page); the particular characters (i.e., identity) which are to be set at that point on the page; and on the form and size as well as the shape of these characters as defined by the input system.

Since the conversion from the "second" digital data, defining the contour of the characters to be set into raster data is complex, and since the raster output form requires repeated multiple character data access, the time required for computation of each raster line is irregular and becomes a significant factor in the recorder control system architecture.

FIG. 6 shows a laser 74 which produces an optical beam 36. The beam passed through a light modulator 78 such as an acousto-optic modulator which switches the beam on and off by a video control signal. This signal is generated in the ODS 134 as a time function of the third digital data stored in the raster line storage buffer(s). The intermittent beam 36 which emerges is passed to a movable mirror 80 which repetitively tilts back and forth about an axis parallel to the plane of the mirror and perpendicular to the plane of the drawing. The mirror is driven by a free running galvanometer motor 110 which moves the mirror at an essentially constant angular speed in one direction, rapidly returns the mirror to its initial position and, repeats this scanning operation upon receipt of the next line sync pulse.

Figure 11:
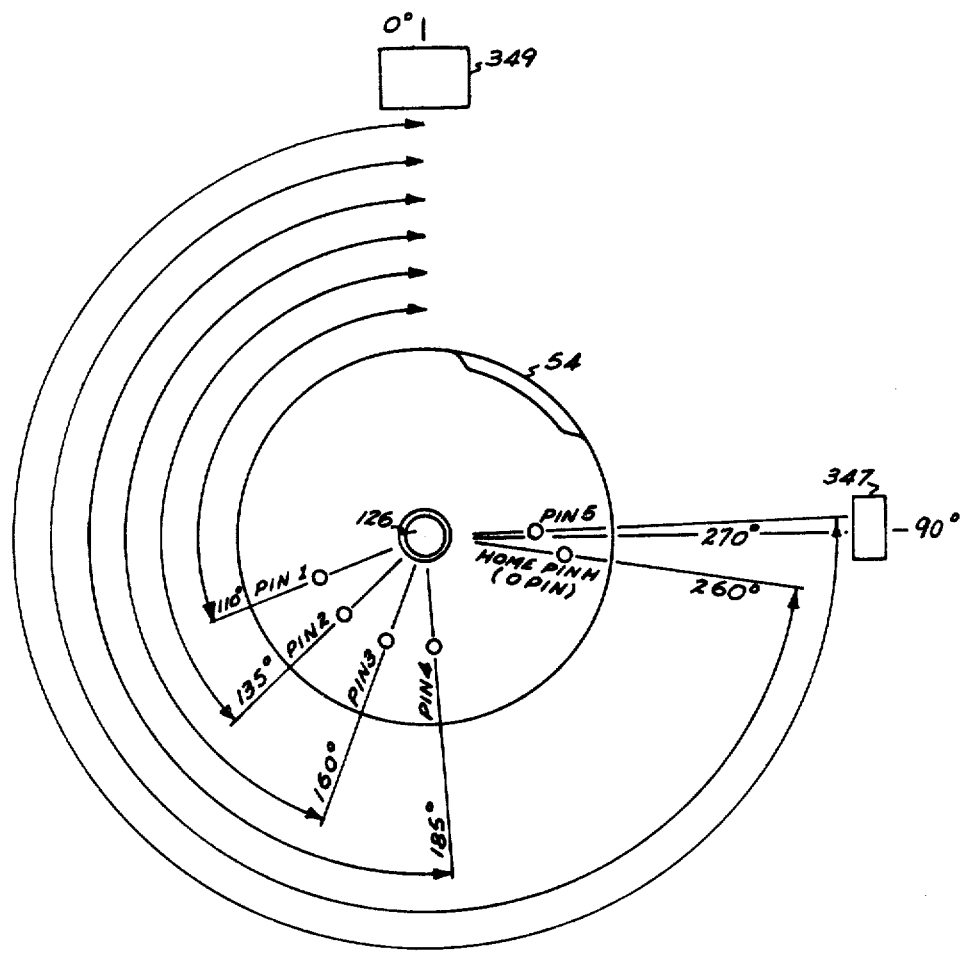
FIG. 11 is an end view of the drum showing the positioning means arranged around the axis of rotation.

The beam is reflected from the mirror 80 and is reflected by a field-flattening spherical mirror 84, which directs it on a suitable recording or print medium 40. The purpose of the field-flattening mirror and the specific system which may be used with the laser recorder shown in FIG. 2, is described in application Ser. No. 095,894 filed Nov. 19, 1979 and now abandoned. The print medium 40 used with the laser recorder of FIG. 4 may be a photographic or electrophotographic film or paper which is sensitive to the particular light frequency of the laser beam. This print medium is moved in a direction transverse to the direction of the beam scan line preferably during the retrace movement of the mirror 80. The print medium is moved by a drum 54 in response to a step drive signal to the drum stepper driver 377 shown in FIG. 12. The drum 54 is shown in FIGS. 4 and 11 with timing pins arranged around the shaft 126 for rotationally supporting the drum. The drum has a series of grooves 122 for receiving the stripper fingers 86 shown in FIG. 8e and which remove the paper from the drum. A series of holes 124 are provided in the drum for communicating a vacuum source to the underside of the paper 40 and holding it to the drum.

As shown in FIGS. 8, in schematic form, the drum 54 is shown as it is rotated to various stations in the recording process, and with the location of the timing means which may be pins 1 through 5 and the Home or Zero Pin as shown in relation to the recording stations.

Figure 8A:
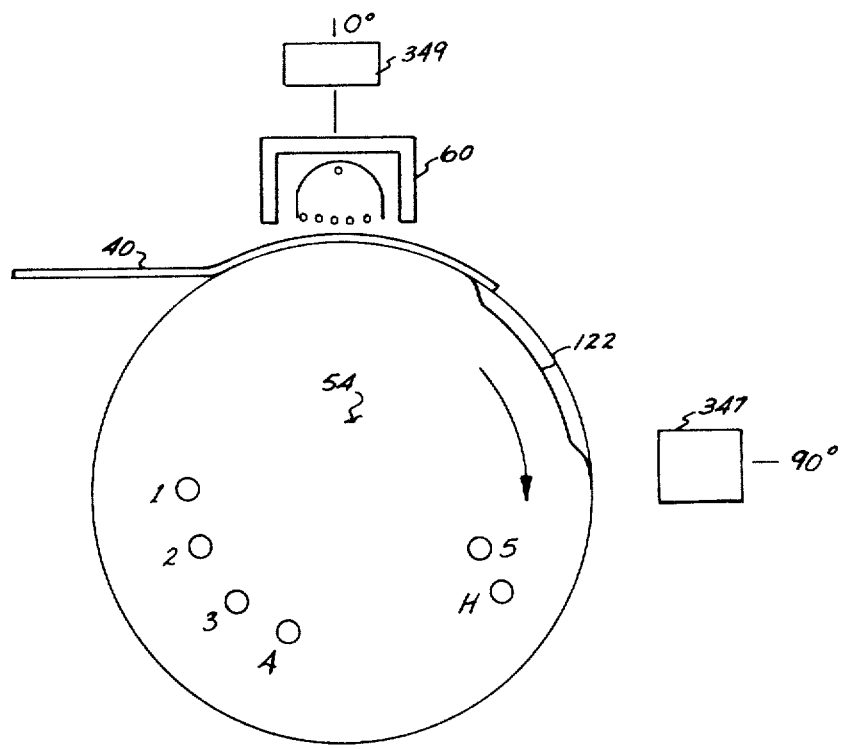
FIGS. 8a-8f show the various positions of the drum as it rotates through the reproduction cycles.
Figure 12:
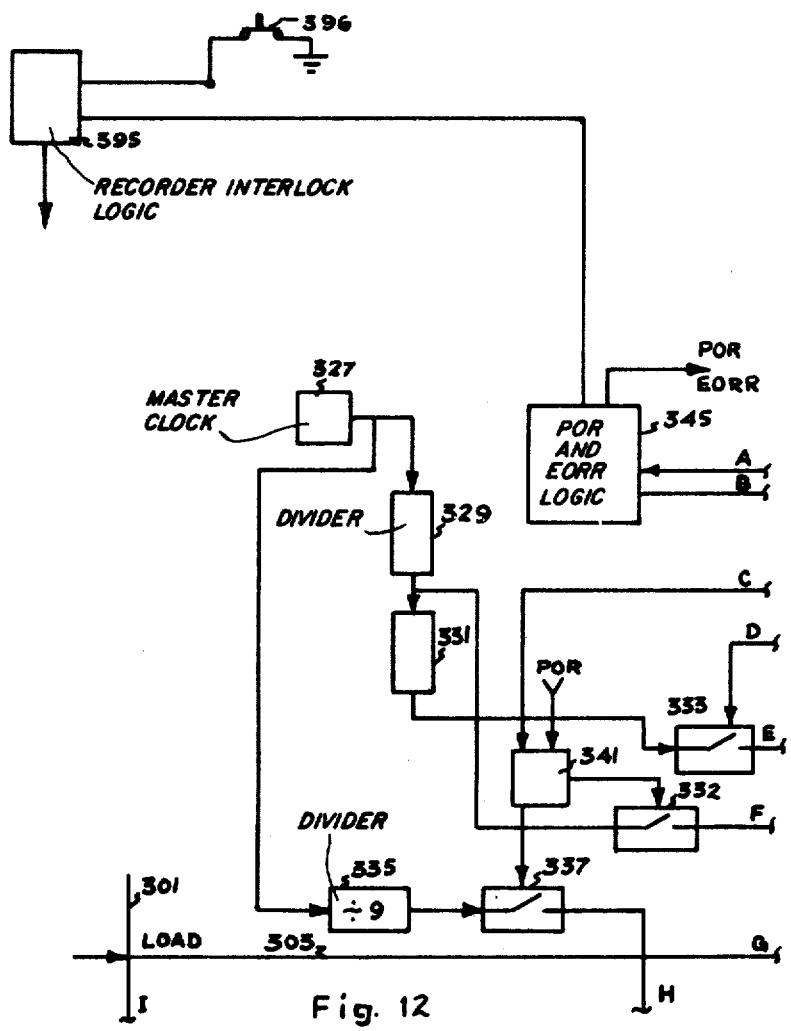
Figure 12A:
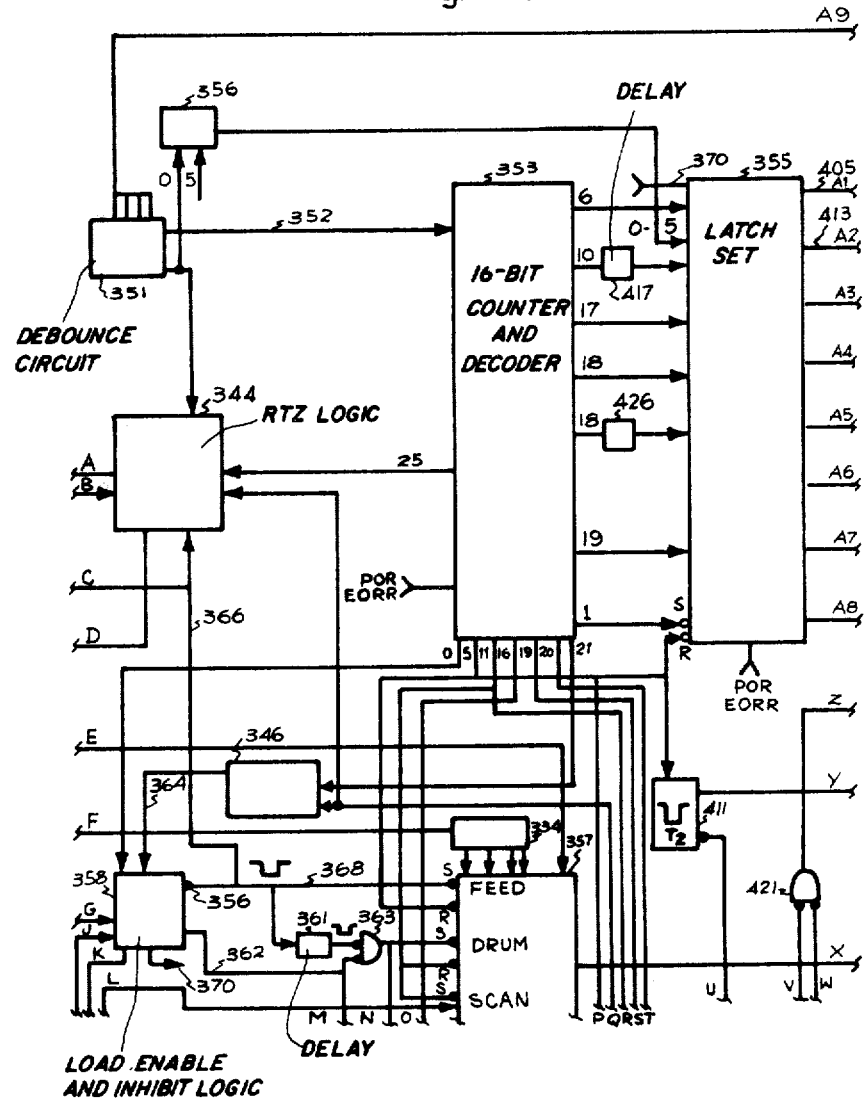
Figure 12C:
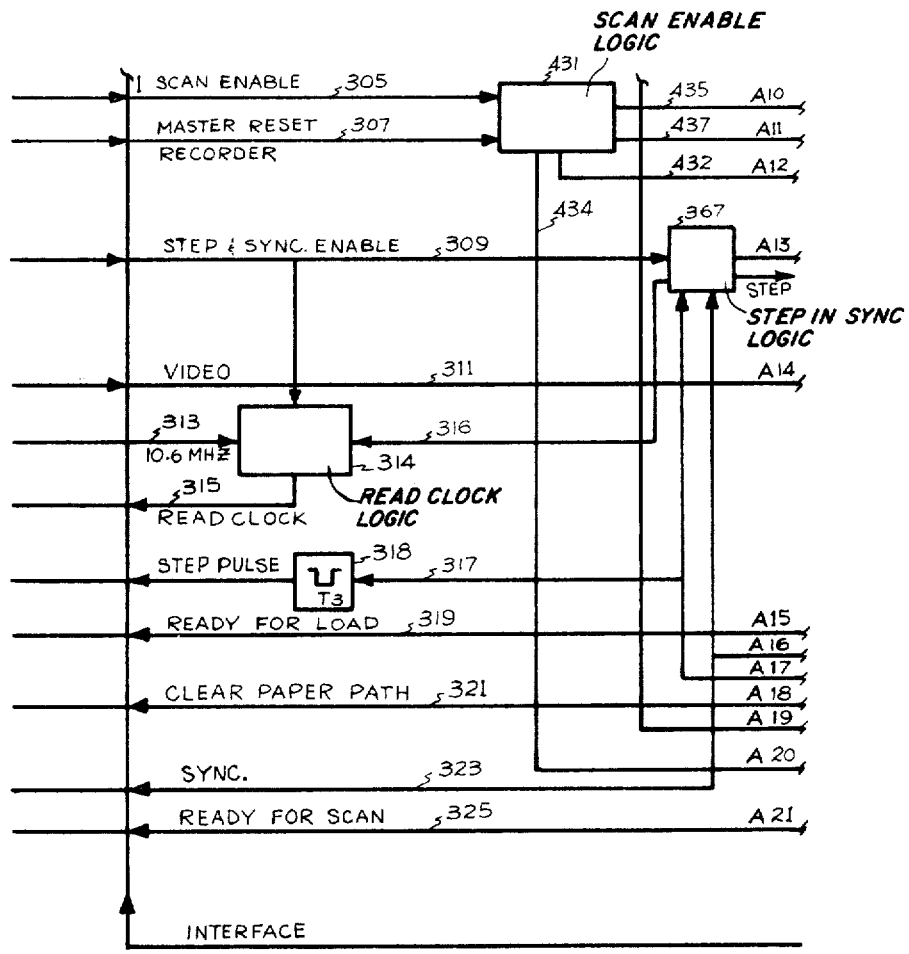
Figure 12D:
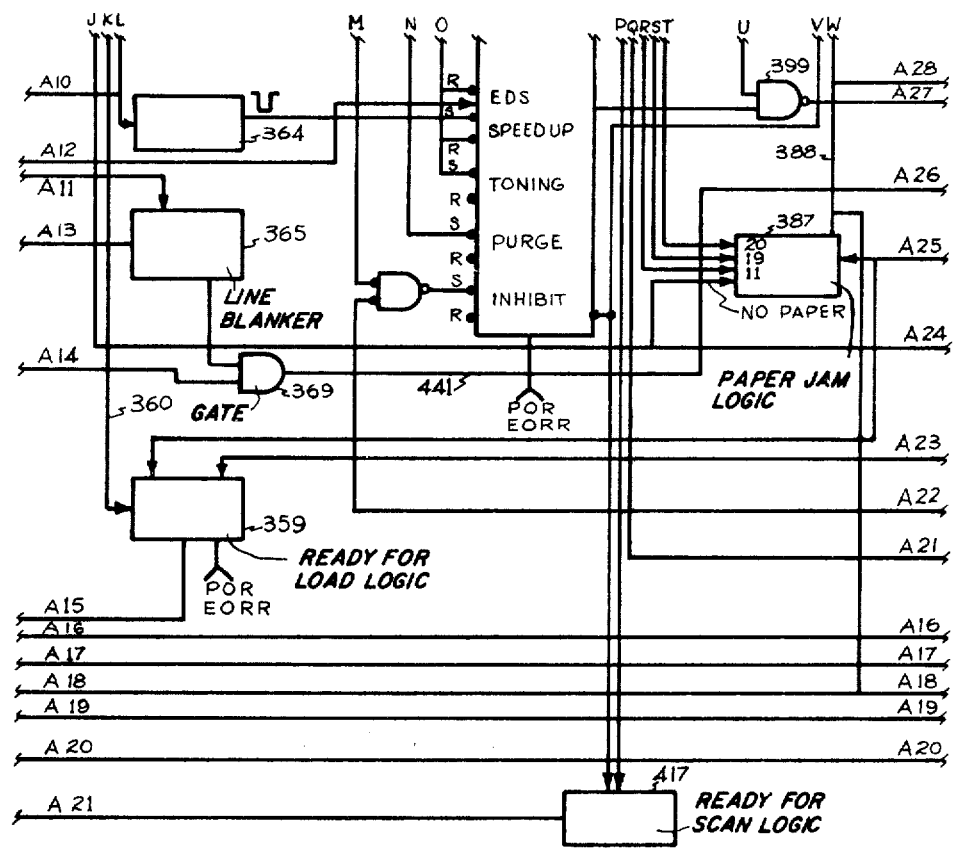
Figure 12E:
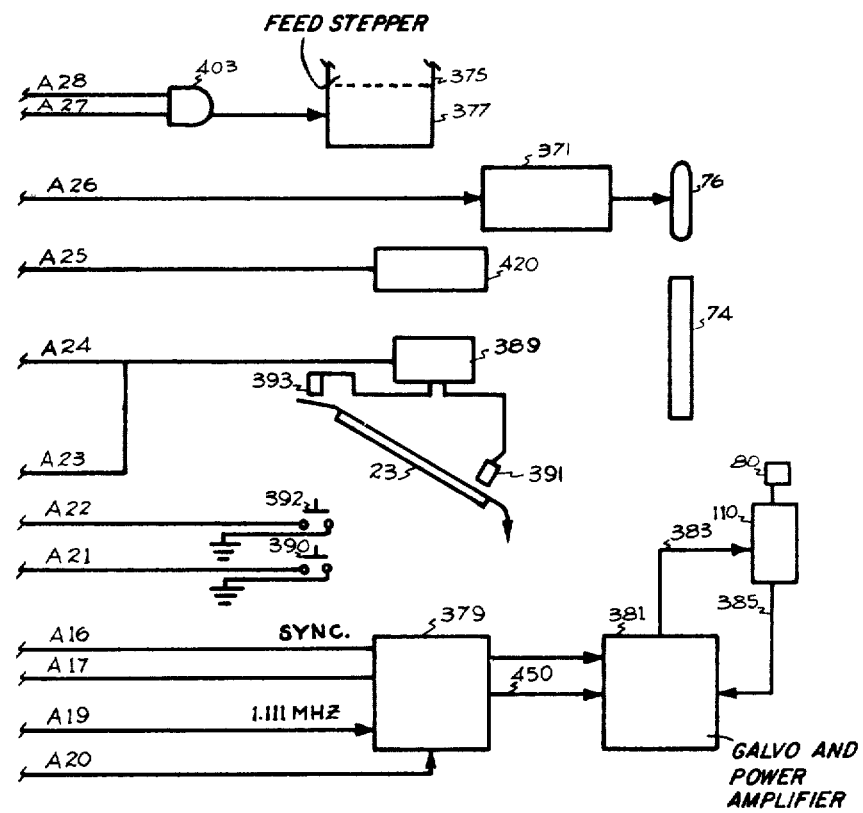

A sensor 349 is arranged at approximately 0 for sensing the passage of timing pins 1-5 with sensor 347 arranged at approximately 90 for sensing the occurrence of the zero or home position pin, shown in FIG. 8a. It should be understood, however, that the sensors 347, 349 are at the same locations although not shown in FIGS. 8 B-F. A counter and decoder 353 is shown in FIG. 12 to the movement of the pins 0-5.

Figure 8B:
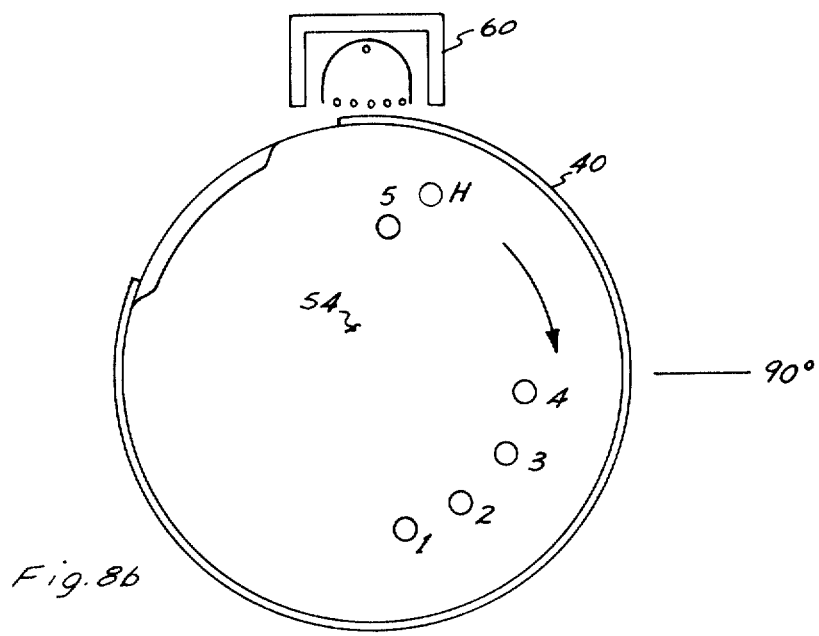

The drum 54 is shown in FIG. 8a in the load cycle and with the paper sheet being pulled by the drum past the corotron. In FIG. 8b the paper has been rotated past the corotron and the paper has been charged. This takes place between the counts of 5 and 10 and and starts with the coincidence of the 5 count from sensor 349 and a zero position indication from the sensor 347.

As shown in FIG. 8b, the trailing edge of the sheet has been brought almost completely past the corotron 60. This occurs at the count of 10 corresponding to two revolutions of pin 5 past the sensor 349 plus approximately a 3 second delay.

Figure 8C:
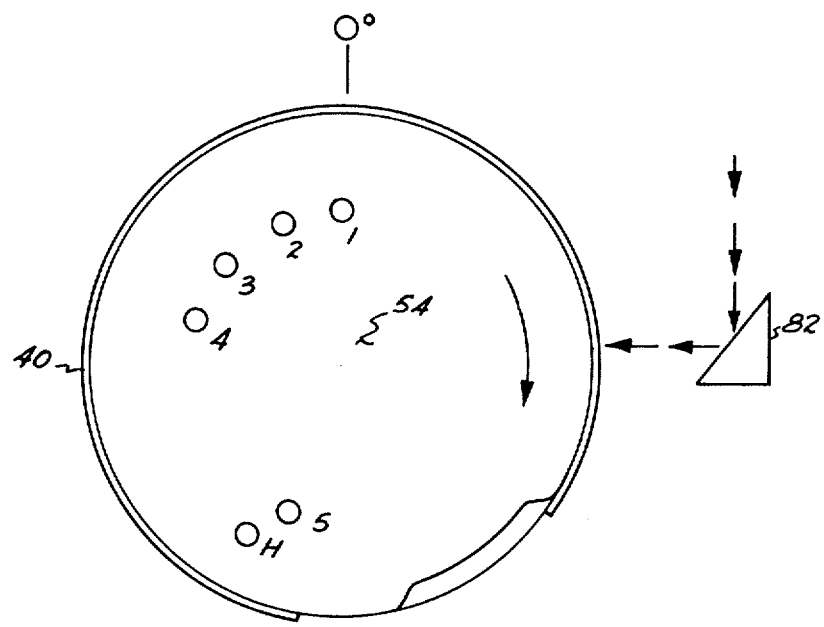

In FIG. 8c the drum is shown with the leading edge located at the exposing station opposite fold mirror 82. This occurs at the count of 11 when pin number 1 is opposite sensor 349.

Figure 8D:
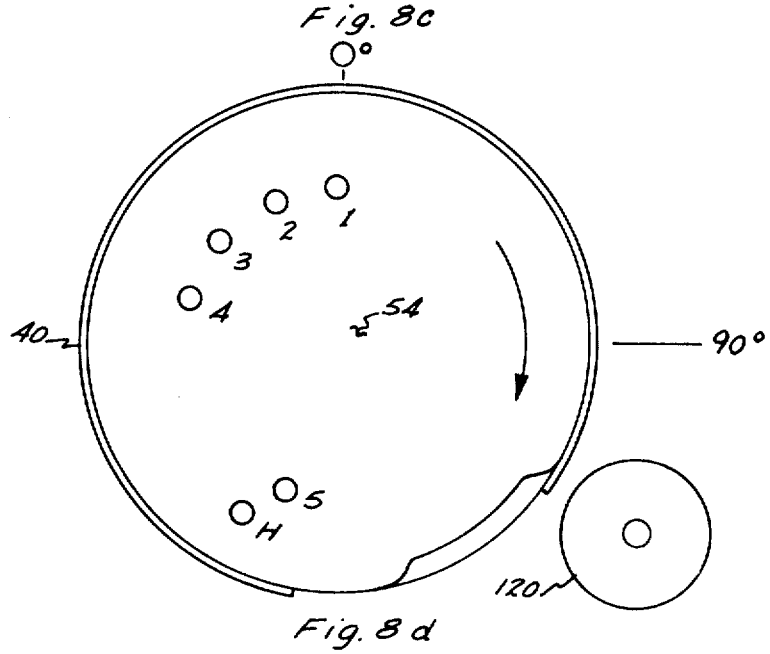

In FIG. 8d, exposure has been completed and at the count of 16 corresponding to pin number 1 being opposite the sensor 349, the speed of the drum is changed to 0.25 inches per second. In the developing process, FIG. 8e the prewet roller 120 is brought opposite and against the paper.

Figure 8E:
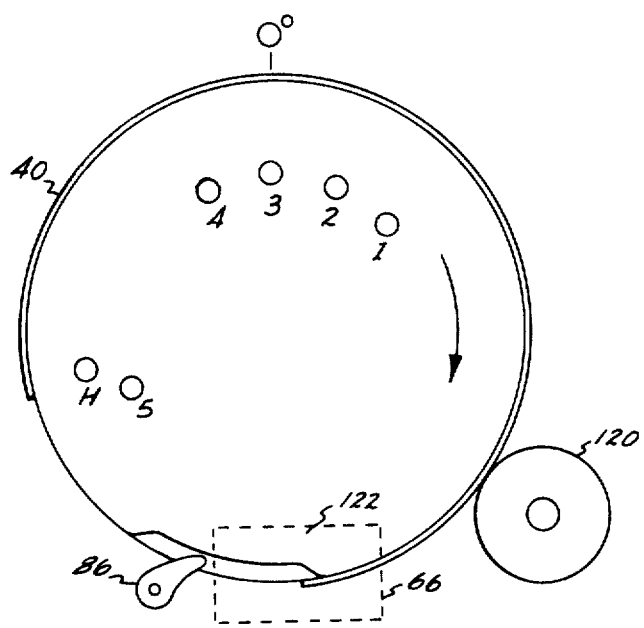

At the count of 18 corresponding to pin number 3 being brought opposite the sensor 349, FIG. 8e, the drying fans are activated and after a variable time delay T1, the toner shoe voltage of the development electrode is activated and the toner is pumped to the paper.

Finally, at the count of 19 corresponding to pin number 4 being opposite the sensor 349 and the stripper finger 86 is activated to strip the paper from the drum.

Figure 8F:
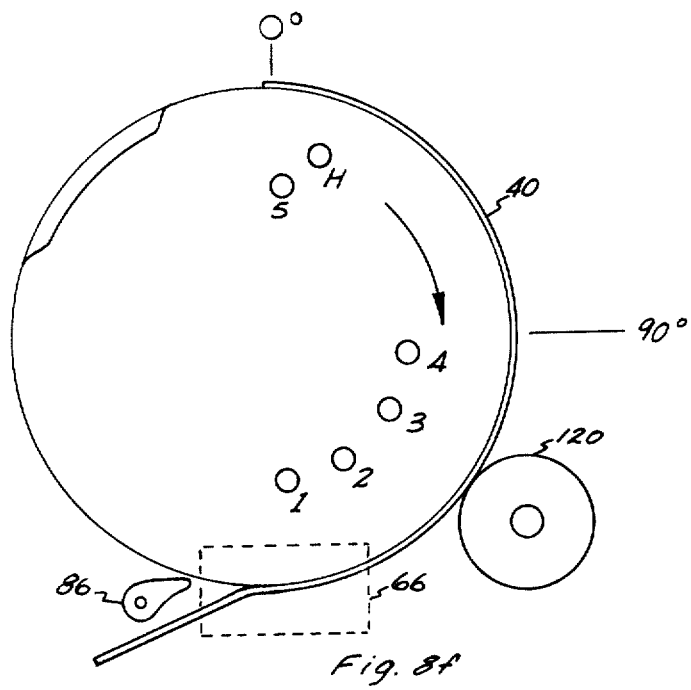

FIG. 8F shows the drum rotated past count 19 and at count 20 corresponding to 5 being opposite the 0° position.

The drum used in the preferred embodiment is shown in FIG. 4 wherein the drum 54 is shown within vacuum holes 124, rotating on shaft 126, and with the pins as shown being arranged around the axis rotation. In addition, stripper finger slots 122 are shown whereby the stripper finger 86 may be placed under the sheet 40 to lift it from the drum 54.

The galvo amplifier and feedback circuit provides a ramp output signal to control the oscillating motion of the galvo 80 through galvo motor 110 will now be explained with reference to FIG. 9 and FIG. 10. The galvo drive system utilizes both position and the velocity feedback to control the motion of the galvo and the sweep of the beam.

The galvo drive ramp signal is generated by ramp generator 379, FIG. 12 and provided overline 450, to the galvo power amplifier and feedback circuit 381. The ramp signal is provided as an input command at summing device 451. The galvo position signal is provided by a transducer in galvo drive 110 and on line 385 is filtered by filter 453 connected to the galvo motor 110 amplified by amplifier 455 and appears at point 457. The velocity loop comprises amplifier 456 and summing device 458 the velocity signal appearing at the output of amplifier 456. The position loop includes amplifier 455 connected to summing device 451 and is responsive to the position of the galvo. The position loop gain is then set to give maximum linearity.

The galvo drive includes a means for providing a feed back position signal. A means shown as pot 454 is provided to calibrate the galvo position signal amplitude, so the galvo position signal characteristic can be matched to the ramp drive input signal.

Specifically, the position pot 454 eliminates the position signal error in the galvo by varying the gain of amplifier 455 to compensate for variations in the galvo position feedback signal.

Additionally, an offset compensation circuit 452 is provided, so that any zero offset in the gal position signal characteristic can be compensated to provide a galvo position feedback signal with an accurate zero. The output resistance of the compensating circuit R1 is made equal to the output resistance R2 of the position amplifier so that substantially a direct relationship can exist between compensating voltage and position signal voltage.

By calibrating the position signal level at the output 457 of the position amplifier 455, the input resistance 471a and 471b between the ramp output 379 and the galvo drive circuit 381 may be made smaller thereby minimizing any resistance variations due to mechanical variations in the galvo drive input resistance 471a.

Additionally, by providing means 454 for calibration of the galvo feedback position signal, the calibration means 454 may be made part of the galvo unit. In this way, the galvo unit can be bench calibrated so that the characteristics of all galvos will match. Under these conditions galvos can be interchanged in the field with the assurance that the characteristics of all galvos will match avoiding a necessary field calibration and additional field testing work.

Figure 9:
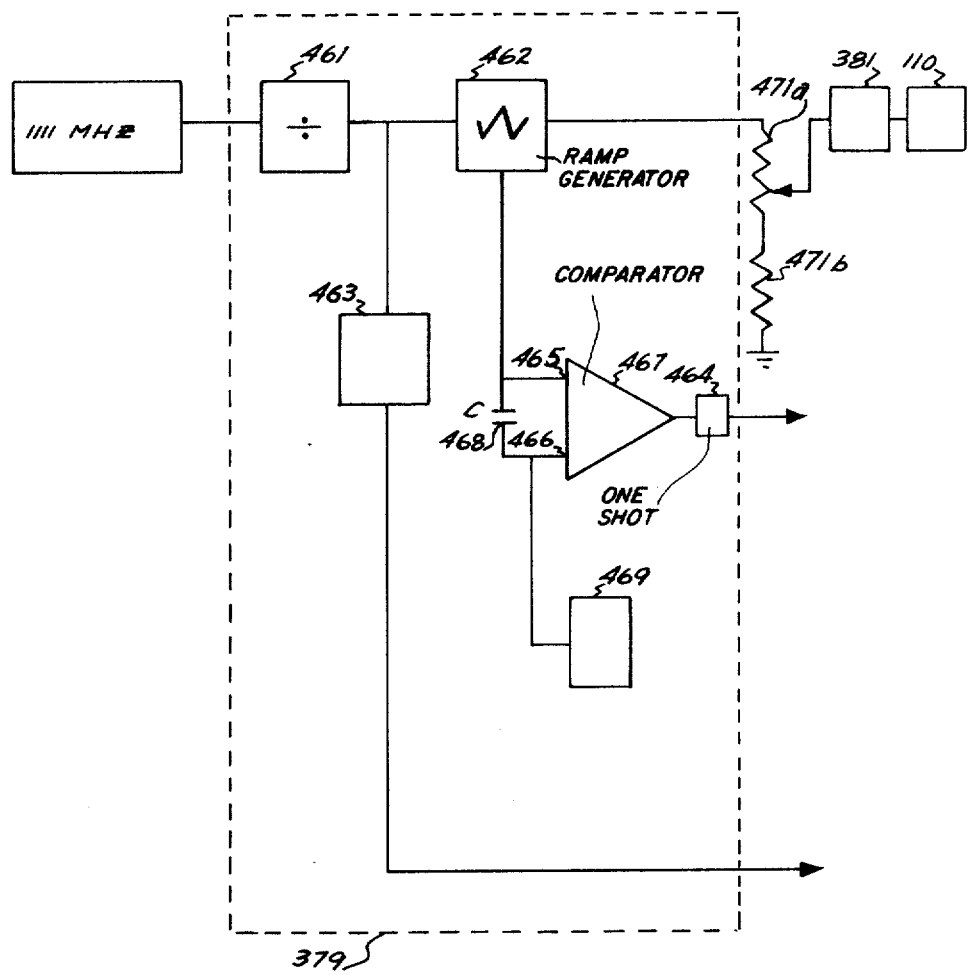
FIG. 9 shows in schematic form the ramp, step and sync generator.
Figure 9A:
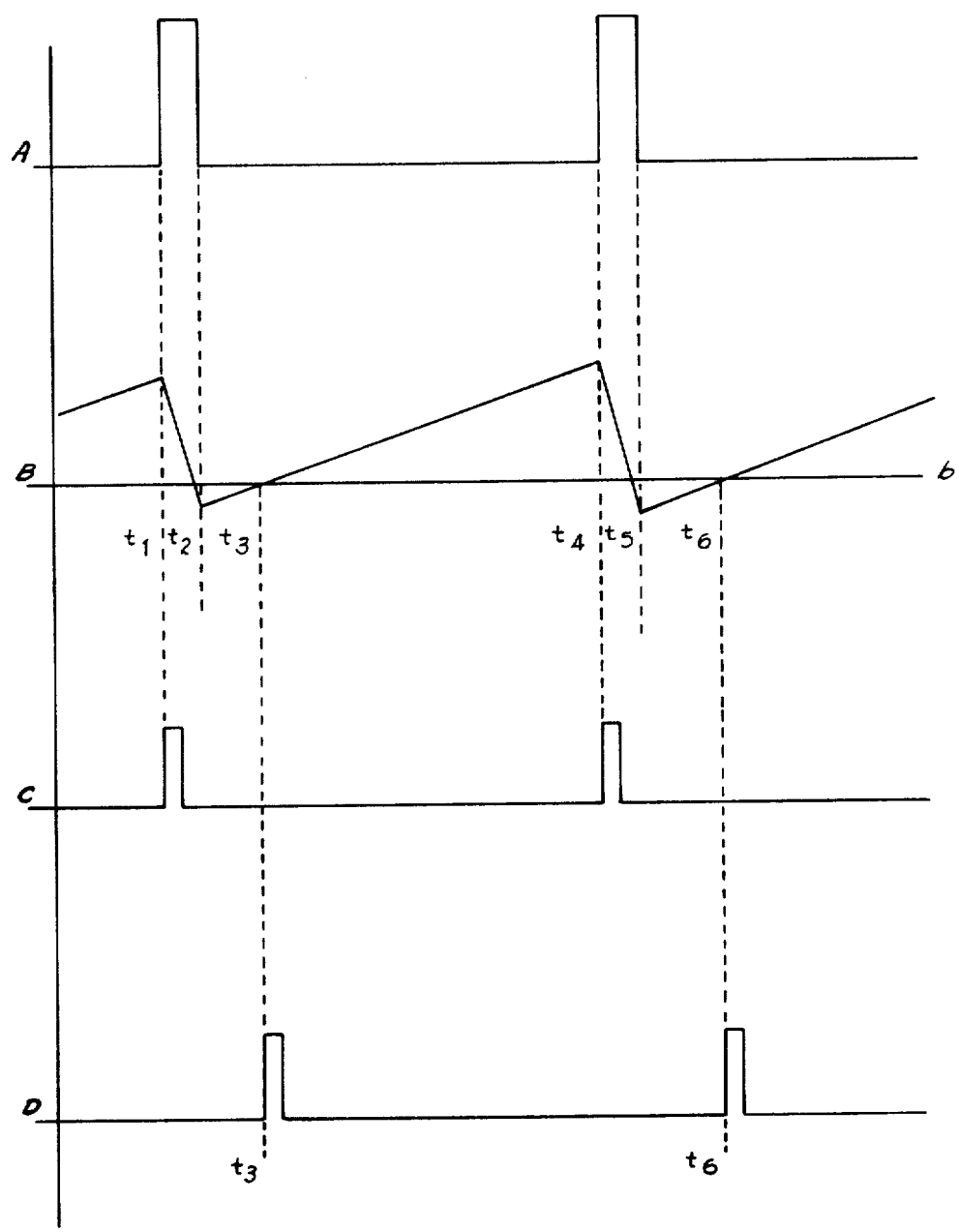
FIG. 9a shows the ramp and step and sync waveforms produced by the circuit of FIG. 9.

The ramp generator 379 is shown in detail in FIG. 9 and with the waveforms produced for the ramp, sync and step signals are shown in FIG. 9a. and waveforms A, B, C, and D.

The master clock 327 of FIG. 12 is divided to provide 1.111 Mhz. signal to a divider 461 which produces a waveform as shown in A being high for 4.5 Ms. and low for 22.5 Ms. The timing of the high and low parts of the waveform of A are not critical but are shown for this preferred embodiment as used in its best mode, being a phototypesetter.

The waveform A of FIG. 9a is provided to ramp generator 462. The ramp B FIG. 9a is then produced in synchronism with the 1.111 Mhz master clock 327 of FIG. 12 so the motion of the galvo and each incremental movement of the beam is preditably synchronized with all other functioning parts of the recording unit and without the need for external devices such as photo cells and gratings for locating the beam position in its sweep locus, and generating additional synchronizing signals and noise.

The sync pulse D shown in FIG. 9a is produced by slicing the ramp waveform B. The slicing means shown comparator 467 has a stable reference source shown as the supply source 469 connected to a first input 466. The ramp waveform B is shown connected to the other input 465 of the comparator 467. A means 468 is shown connected between the comparator inputs 465 and 466 for reducing noise and for allowing the development of a clean reliable sync pulse accurately phase related to the ramp so precise control of the data transmission with regard to the beam sweep locus is possible.

As shown in waveform B, the ramp has a flyback period between t1 and t2 and is an increasing level between t2 and t4. Time t1 corresponds to the leading edge at the 4.5 ms. pulse. This leading edge produces a step pulse shown as C produced through a buffer 463.

The ramp B is sliced at level b corresponding to the reference voltage level at the comparator input 466. Producing a change in the output of the comparator 467 and at the input of a one shot 464 to produce a sync pulse at the start of scan as shown in FIG. 9D at time t3 and t6.

The step pulse C is derived from the leading edge of the waveform of A corresponding to the beginning of the flyback period of the ramp.

Figure 10:
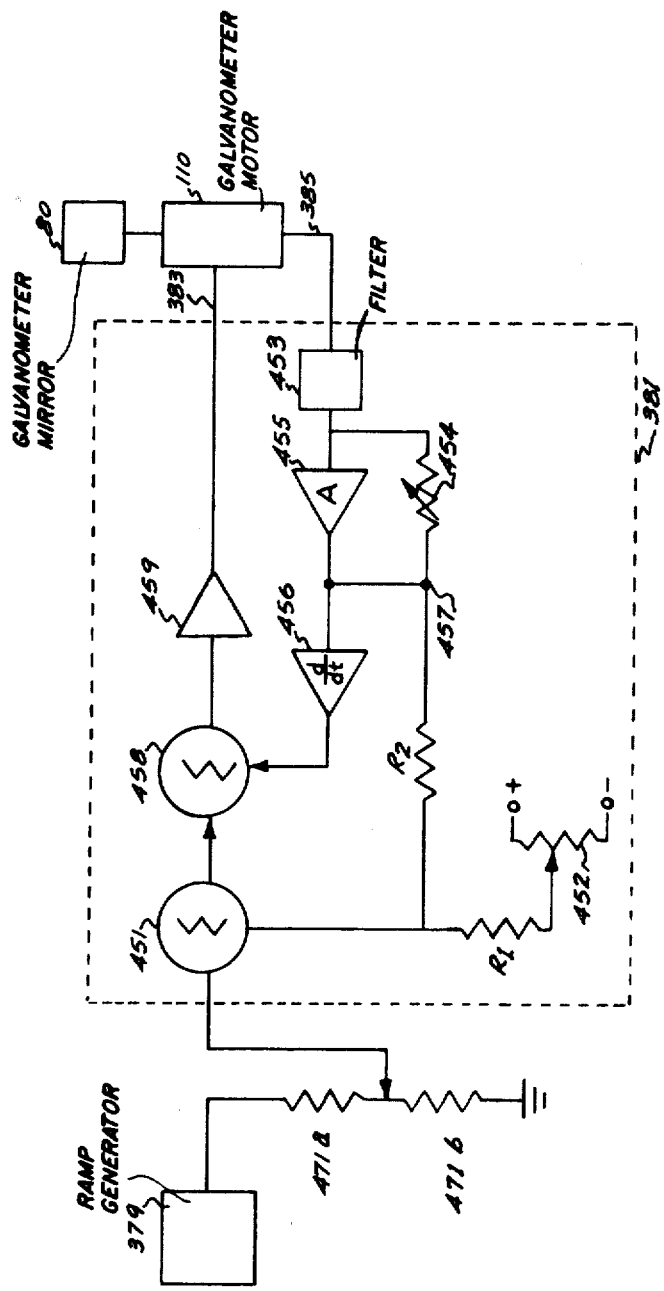
FIG. 10 is a schematic view of the galvo amplifier and especially the means for minimizing the variations in the galvo output sweep.

The galvo power amplifier 381 shown in FIGS. 9 and 10 is driven by the ramp output, and is equipped with resistances 471a and 471b to set the resistance required to bring the ramp output to the necessary level corresponding to the desired sweep length.

In accordance with the principles of the invention, the resistances 471 contains two resistances 471a and 471b, 471a being a variable resistance having a value considerably less than that of 471b, the total set value of 471a and 471b being summed to the required total input resistance to galvo drive 381.

The ramp output must be adjustable to compensate for the tolerance ranges of any of the characteristics in the galvo drive 381 and galvo mirror motor 110.

It is, therefore, impractical to chose a single fixed resistance of high quality to control the ramp. However, when the total resistance 471 is made adjustable, then variations in the adjustable resistance create an effect which is proportional to the total value of the resistance.

For example, where a characteristic of the galvo drive has a possible out of tolerance condition of 5%, the fixed resistance 471a may be equal to the 95% of the total resistance required and the variable resistance 471b may be made equal to the 5% of the total necessary as may be required to adjust for the 5% out of tolerance condition in the galvo system. Any variation in variable resistance 471a due to vibration will result in only 5% of the total possible resistance variation as compared to where the resistance is equal to 100% of the value necessary to drive the ramp output (the total of 471a and 471b).

Accordingly, the integrated resistance 471 has been modified so that a fixed resistance of substantially unchanging value is provided together with a variable resistance, the variable resistance being the maximum value necessary to compensate for the expected tolerance condition produced by any of the galvo drive characteristics.

As stated, the variable resistance is chosen to have a range comparable to and related to the tolerance range of at least one characteristic of the beam directing means or specifically the galvo amplifier of FIG. 10 and the galvo and its motor drive.

Within that tolerance range, the actual value of the said characteristic will produce a sweep locus having a length extending approximately to the desired sweep end point but deviating from that end point. The sweep deviation will depend on the extent of the deviation of the actual characteristic value from the desired value necessary to produce the exact sweep end point.

The variable resistance has an adjustable range which is limited to that expected tolerance range and which can be set to compensate for the deviation in the actual characteristic value of the galvo drive. The result is that the ramp control signal is adjusted to compensate for any deviation of a characteristic of the galvo drive from an expected value necessary to produce the desired scan path length.

The recorder controller is now described with reference to FIG. 12.

As shown in FIGS. 12, 12a–12e, the controller is connected to the ODS through interface 301. The ODS is conditioned by a dedicated processor and reflects back to the to the controller at set of handshaking signals in response to the controller's commands. The state of these reflected signals indicate to the controller the condition of the ODS and by these signals the controller can make the appropriate decisions for each of the successive steps in the process.

The interface lines are shown in FIGS. 12, 12a–12e, and the controller signals and functions of these signals are as follows.

Line 303 Load FIG. 13B: The Load (L) signal is reflected back from the ODS in response to the controller Ready for Load (RL) signal FIG. 13A appearing on line 319. As a result of this signal sequence, the controller commands the loading of imaging surface in response to the appropriate conditioning of the ODS.

Line 325 Recorder Ready for Scan (RFS) FIG. 13C:

The RFS Signal is sent to the ODS from the Ready for Scan Logic 417, responsive to an indication that the drum has stopped with the leading edge of the paper opposite the scan gate. The RFS returns to its complementary condition after receipt of the Scan Enable (SE) signal. The RFS signal is inhibited during the purge cycle, preventing the ODS from outputting data.

Line 305 Scan Enable (SE) FIG. 13D:

The SE signal is reflected back from the ODS in response to a controller RFS on line 325, driving the RFS signal high after a short delay. The SE signal is provided to the Scan Enable Logic 431 which ultimately controls the Stepper Control Logic 357, as will be explained. The SE signal goes high to initiate a fast stepping at the drum drive at the End of Scan (EOS).

Line 307 Master Reset Recorder (MRR) Line 307:

The MMR is provided from the ODS when the transmission of data is stopped for any reason and the characters already imaged on the sheet and forming a latent image are to be developed into a finished copy. The MMR provides a leading edge signal substitute to the SE leading edge normally occurring at the end of a page of text FIG. 13D. The leading edge of the MMR is OR'd with the SE by the Scan Enable Logic 431. The controller responsive to the leading edge of the MMR or the SE causes a fast stepping of the drum until the image surface is positioned for development of the latent image.

Line 309 Step and Sync Enable (SSE) FIG. 13F:

The SSE signal is reflected from the ODS to the Step and Sync Logic 367 responsive to the Sync pulse from the controller ramp generator 379 signaling the start of a beam sweep occurring at the start of each raster line. The SSE is reflected back by the ODS responsive to the Sync pulse when an ODS flag indicating full line buffer is set.

Line 311 Video FIG. 13G.

Video from the ODS Line Buffer is transmitted to the beam modulator 76 through a line blanking means 365 at the start of each raster line.

Line 313 10.6 MHz. clock FIG. 14H and 14H':

A 10.6 MHz. clock pulse is provided to Read Clock Logic 314 which is enabled by the Step and Sync Logic 367 through line 316. 530 KHz. Read Clock appears on line 315 and controls the data output rate from the ODS line buffer.

Line 317 Step Signal:

The Step Signal is provided by Ramp Generator 379 at the output of 463 FIG. 9 which produces a Step pulse upon retrace of the beam to its starting position at the start of the page. A delay is provided by a delay means 318 to assure video transmission is finished.

Figure 13:
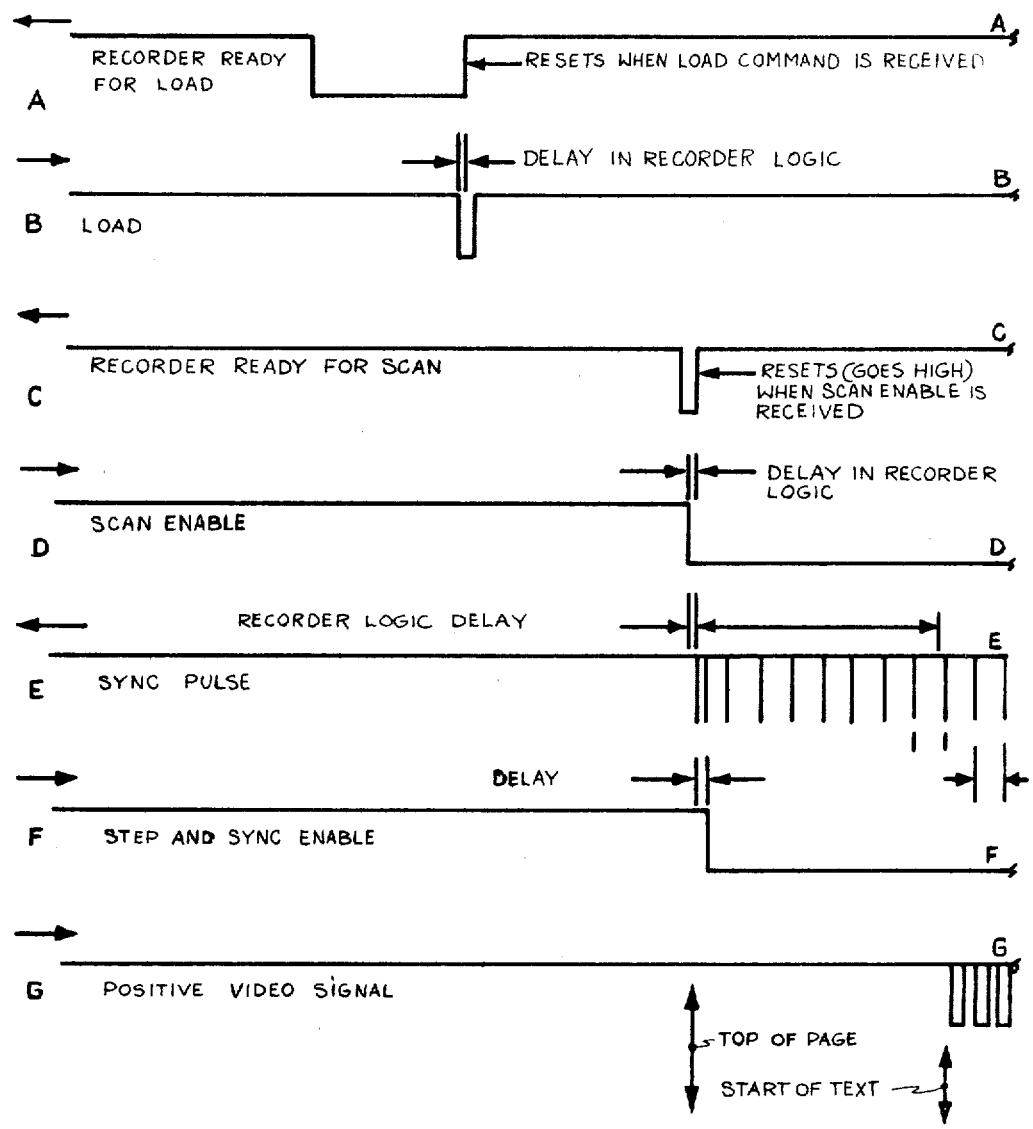
FIGS. 13 and 13a are the time diagrams of the control and data signals in the controller of FIG. 12.
Figure 13A:
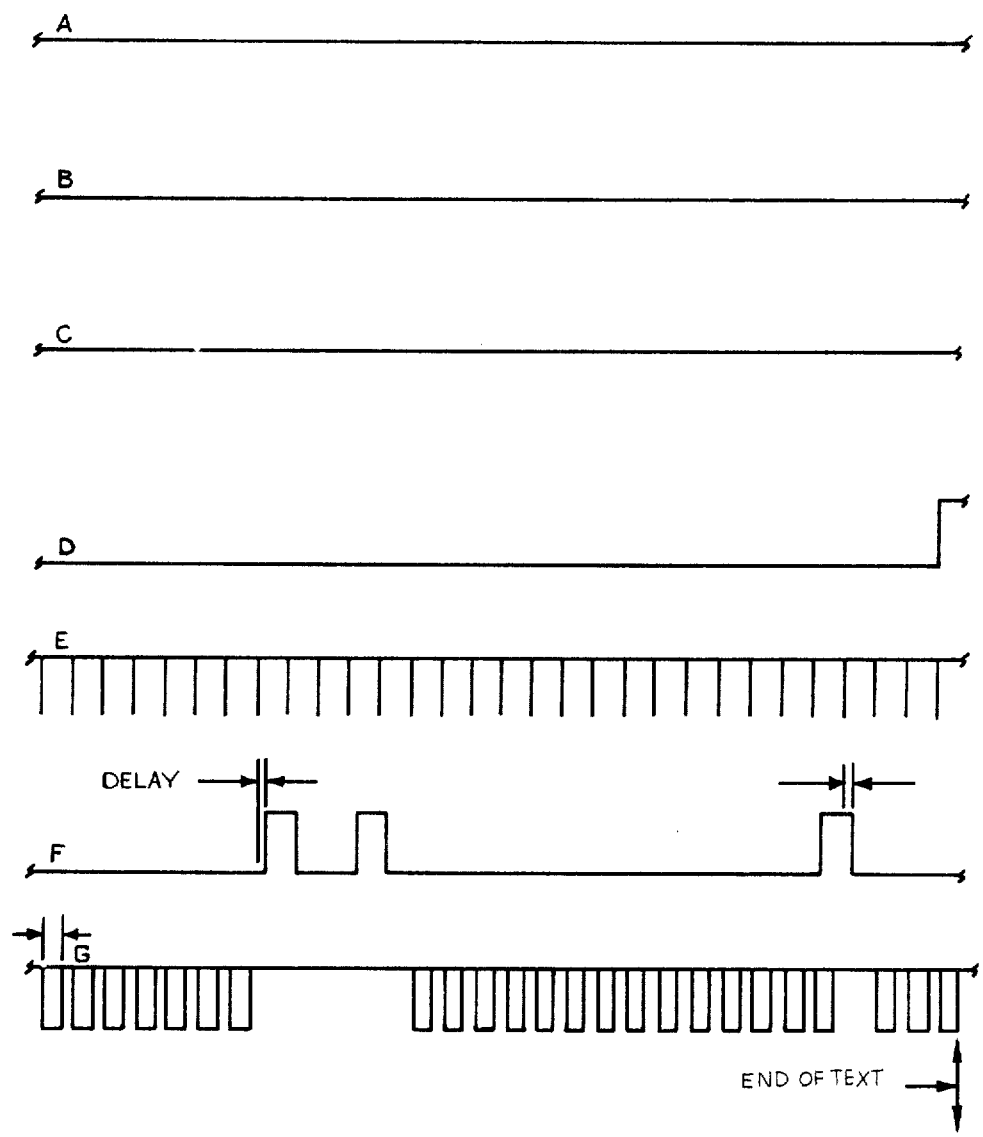

Line 319 Ready for Load FIG. 13A:

The Ready for Load signal (RFL) is provided by the controller when the recorder is reset, zeroed and ready to initiate a printing cycle.

Line 321 Clear Paper Path: (Paper Jam)

The Paper Jam signal is provided to the ODS data system upon the controller paper jam logic 387 receiving a jam signal from one of the detectors located in the controller and may be used to inhibit further data flow.

Line 323 Sync Pulse FIG. 13E:

The Sync Pulse is provided from the Ramp Generator 379 for each sweep of the beam along a raster line.

As stated, the controller has a master clock oscillator 327 which generates a 10 MHz. master clock. That clock signal is reduced by divider 329 to provide a 1429 Hz. clock through switch 332 to divider 334. Divider 334 provides divide by 2, 8, 12 and 40 functions for supplying the divided 1429 Hz. signal. Additionally, a Return to Zero (RTZ) clock signal from divider 331 provides a divide by 2 function for the 1429 Hz: to produce a 715 Hz. clock signal through switch 333 to the Stepper Control Logic 357.

The 10 MHz. clock 327 is further reduced to 1.111 MHz. by divider 335 and provided through switch 337 to the Ramp Generator 379.

Latch 341 responsive to the Power on Reset (POR) and End of Recording Reset (EORR) Logic Controls the operation of switches 337 and 332 respectively. The switch 333 is controlled by the return RTZ to Zero (RTZ) Logic 344.

A recorder interlock logic 395 provides an interlock switch signal to the POR & EORR Logic 345, the POR and EORR Logic then appropriately resets all the control logic to its initial states as well as returns the drum to its zero or home position through a command signal to the RTZ Logic.

As shown in FIG. 4, and FIG. 11, an end view of the drum 54 is shown schematically with a timing or positioning means arranged around the axis of rotation.

The timing means may be pins as shown and numbered 1-5 and arranged circumferentially around the axis of rotation. Pins numbers 1-5 are arranged at a first radial distance from the axis of rotation while pin 0 is arranged at a second radial distance from the axis of rotation.

A suitable sensor 347 is arranged at 90° to engage the home position pin labeled O or H and a second sensor 349 is arranged at 0° to engage pin numbers 1-5.

In accordance with this invention, the number and arrangement of the timing means is minimized to the number of operating stations, even through the recorder undergoes a plurality of cycles to complete the imaging process. This is accomplished in the system by referencing a timing mark to the recorders stations around the drum.

It should be noted that this invention is not limited to the pin-type timing means used in the preferred embodiment as any other suitable sensing means known in the art to sense the occurrence of timing marks placed a, the locations of pins H to 5 may be used. For example, a disc, with holes in the place of the pins could be used to pass light to a sensor to indicate the angular position of the drum. As shown in FIG. 11, the drum is shown in the Home position with the home pin H or O located to 90 opposite the home or zero position sensor 347.

Referring back to FIG. 12, sensor 349 provides a pulse each time one of the pins 1-5 passes it. This pulse is provided through debouncing circuit 351 and line 352 to the 16 bit Counter and Decoder 353. The zero or home position sensor 347 provides a pulse each time the home pin passes sensor 347, at 90 rotation. This pulse is also provided through the debouncer 351 once each revolution to the RTZ logic 344. The POR & EORR signal may be produced responsive to the RTZ logic 344 and is provided to the 16 bit Counter and Decoder 353, to Latch Set 355 and to Stepper Control Logic 357. The function of the POR & EORR signals is to reset these units as well as the "Ready for Load Logic 359."

The Latch Set 355 responds to specific decoded counts at the output lines of the 16 bit counter and decoder 353, each of the output lines having a signal responsive to a respective count as shown by the numerals 0-25.

Figure 15:
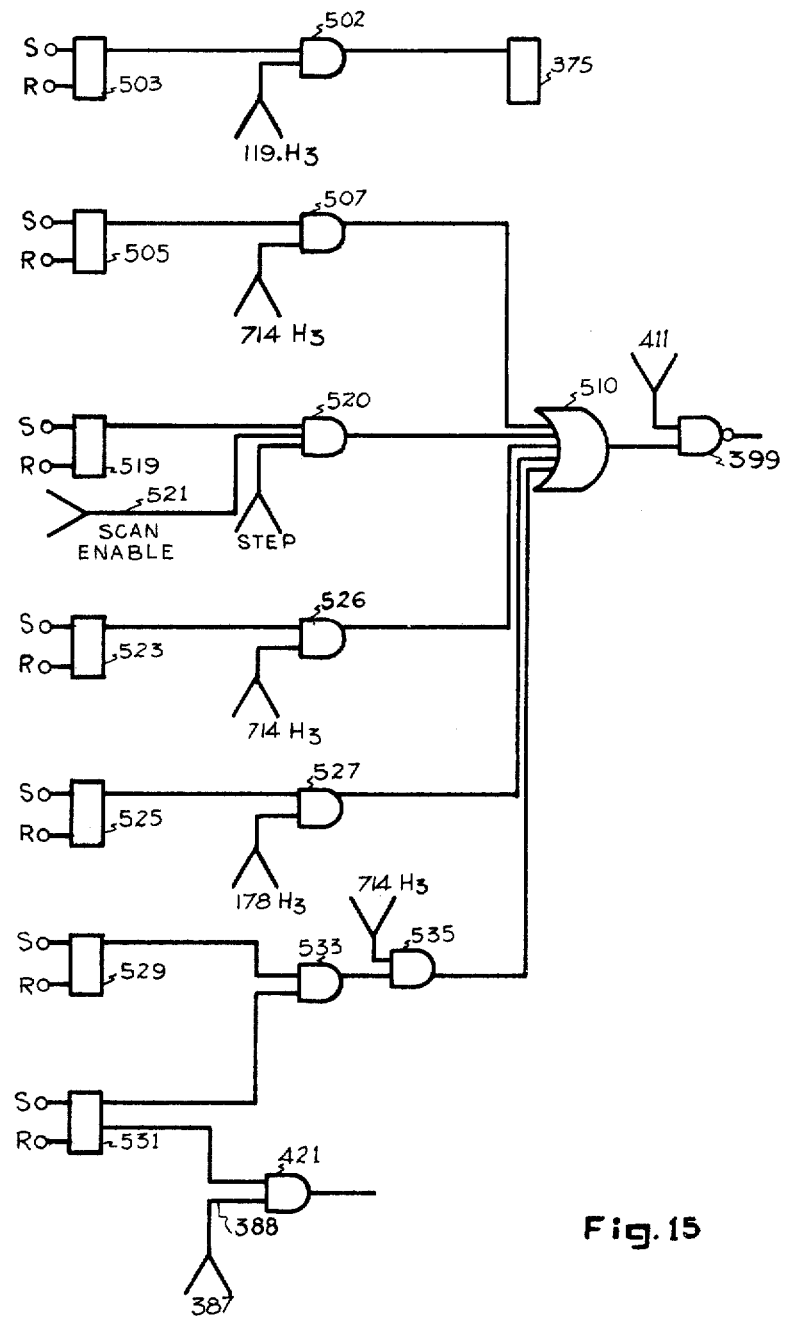
FIG. 15 is a partial detailed view of the stepper control logic portion of the controller of FIG. 12, disclosing the manner in which the various drum drive signals are produced.

Additionally, the Stepper Control Logic 357 contains a series of set-reset latches and gates for controlling the feed and drum drives, shown in greater detail in FIG. 15.

The separate latches within the Stepper Control Logic have outputs connected as shown in FIG. 15 for the separate functions as follows:

Feed Latch 503:

Connected to the Feed Stepper Drive 375 and enables the gating of a 119 hz. signal to the feed drive through gate 502.

Drum Latch 505:

Connected to the Drum Stepper Driver 377 through and gates 507 and 399 and OR gate 510 to provide a 714 Hz. pulse to the drum drive for the loading and charging cycle.

Scan Latch 519:

With the SE signal, it enables gate 520 to pass the step pulse FIG. 9C to the drum drive 377 during the scan cycle.

End of Scan Speed-up Latch 523:

Enables gate 520 to pass a 714 Hz. signal to rapidly advance the drum when the SE signal changes state indicating the end of a page.

Toning Latch 525: Enables a 178 Hz. signal to the drum drive to advance the drum at 0.25 inches per second for developing the image.

Purge Latch 529 and Inhibit Latch 531:

Enables the gating of a 714 Hz. signal to the drum driver and disables gate 421 to inhibit the operation of selected operating units in the reproduction process.

The Load Enable and Inhibit Logic 358 provides a Load Signal at terminal 356 responsive to a predetermined count from the Counter and Decoder 353, the RTZ logic 344 being inhibited by a Load Signal on line 366 as the drum 54 revolves during the recording process. The Load Enable and Inhibit Logic 356 also provides a Home Signal to a gate 363, gate 363 responsive to a Load signal appearing coincidently with a zero or home signal on line 362 producing a signal to the drum latch set terminal of the Stepper Control Logic 357.

A one shot multivibrator 364 provides a pulse to the Stepper Control Logic 357 upon an End of Scan (EOS) signal from the Scan Enable Logic 431 and responsive to the SE signal going high, to change the speed of the drum and drive it at a higher speed as will be explained.

A line blanker 365 is responsive to the step and Sync Logic 367. Its purpose is to disable the video for a predetermined number of initial raster lines and may be used to insure a predetermined margin width at the start of each printed page. The step and sync logic 367 is in turn responsive to the SSE signal from the ODS and to the Sync signal from the ramp generator 379 to control the amount of lines blanked at the beginning of each printed page.

The video is supplied by the ODS on line 311 to gate 369. The gate when enabled by a signal from the line blanker 365 passes the video to the modulator driver 371 and to the modulator 76.

The Ramp Generator 379 enabled by the Scan Enable Logic 431 and responsive to the 1.111 MHz. clock from divider 335 generates a ramp signal to drive the galvo power amplifier 381. Galvo driver 381 then in turn drives galvo 110 through the feedback loop comprised by lines 383 and 385 to drive the beam across the imaging surface.

A paper jam logic element 387 is responsive to the decoded count signals appearing on the designated decoded lines from Counter and Decoder 353 as shown by the Counts 11-20 as well as the presence or absence of paper in the copy delivery slot 23.

The device is now further disclosed with reference to the operation and description of the controller with the ODS and the recording unit.

The operation of the device will not be described wherein the position of the drum is assumed not to be at the zero position corresponding to the location of the home or zero pin opposite the zero position sensor 347 at 90° of the drum axis of rotation.

Assuming power is turned on or an end of run is indicated by a count of 25 from the Counter and Decoder 353 provided to RTZ logic 344 or a signal is provided upon power turn on through the Recorder Cover Interlock Logic 395 to the POR and EORR Logic 345 and to the RTZ Logic 344, the drum will be driven to its home position. The RTZ Logic will close switch 333 sending a 715 Hz. signal to the Stepper Control Logic 357 and to Drum driver 377.

When the drum is being driven towards its home or zero position by the drum stepper driver 377, the 16 bit Count and Decoder 353 is incremented by each of the pins 1-5 passing sensor 349. However, none of the reproduction stations are activated as the system is preprogrammed to ignore the counts zero through 4.

Upon reaching its zero position, the zero position pin is opposite sensor 347 providing a zero or home position signal through the debouncer 351 to the RTZ logic 344. At this point, the RTZ logic diables switch 333 and decoder 353 provides an enabling signal to the Load Enable and Inhibit Logic 358. Responsively, Load Enable and Inhibit Logic provides a signal on line 360 to the Ready for Load Logic 359. The Ready for Load (RFL) signal FIG. 13A is then provided through the interface line 319 to the ODS. The RFL Signal goes low until a reflected Load Signal on line 303 is received from the ODS, the Load Signal FIG. 13B being a pulse of one microsecond or longer indicating that the ODS is ready to provide video data.

At this point, the position of the drum is approximately shown in FIG. 11 with the home or zero pin just past the sensor 347.

At the Load signal occurrence, the feed stepper is activated to feed paper onto the drum from the paper supply roller 42. The Load signal on the line 303 is connected to the Load Enable and Inhibit Logic 358. Resonsively, the Load signal appears on the line 366 disabling the RTZ Logic 344 and causing Latch 341 to close switch 332 connecting the 1429 Hz. clock through divider 333 to the feed stepper driver 375 and causing it to feed paper from the roll onto the drum at one inch per second.

The Load signal on the line 368 is also provided to the set terminal of the Drum Latch of Stepper Control Logic 357 through delay 361 and through gate 363. With the occurrence of the Load signal on line 368 and with a home count signal at terminal 362 of Load Enable Logic 358 and after a 2.6 second delay produced by 361, the drum stepper is activated so that its surface moves at one inch per second. The delay provides time for the paper feed to advance the paper 2.6 inches to the drum. At this point, the Load Signal from Load Enable and Inhibit Logic 358 is also applied on line 370 through Latch 355 to line 405 through gate 407 and to end device distribution panel 400 to actuate the vacuum. The vacuum is applied through ports 124 as shown in FIG. 4, and draws the leading edge of the paper against the drum. After approximately 5-6 inches of paper is wrapped onto the drum, the feed stepper is halted, as power is removed from the feed stepper by a suitable time out device, not shown. As the paper now adheres to the drum under the force of the vacuum, the drum pulls the remaining approximately 14 inches of paper onto its surface.

When a length of approximately 19 inches of paper has been pulled from the roller, the drum is stopped momentarily and the cutter is activated.

Referring now to back to FIG. 11 when the drum was in its initial home position, all logic was initialized and the Counter Decoder 353 was initialized at zero. As the drum turned on the clockwise direction, pin 1 initially at approximately 110 was then rotated opposite the sensor 349. The "1" count from Decoder 353 provides a free wheel signal through latch set 355 to line 409 and to the feed stepper driver 375, deactivating the feed stepper driver and allowing it to free wheel. At the count of 5, the Decoder 353 provides a signal on the Count 5 line to the one shot multivibrator 411 which disables gate 399 temporarily by a time delay inhibiting a step pulse from reaching the drum stepper driver 379 for 100 to 200 microseconds required to cut the sheet from the roll.

Power is reapplied to the feed stepper 375 during this delay interval and during the cut function to clamp the paper and prevent movement during and following the cut. The paper is cut on the fly, but is not actually moving during the 100 to 200 microsecond required to make the cut.

The drum then continues pulling the paper until approximately two inches of the uncovered drum before the leading edge of the paper is under the corotron.

This occurs after count 5 and after the drum is rotated a complete revolution and when the home pin or zero pin is opposite sensor 347 so a coincident 0 and 5 count signal is provided to latch 355 from gate 356.

The corotron is activated responsive to a count of 5 and responsively to a home or zero pulse from sensor 347. This pulse is applied through the Latch Set 355 on line 413 through gate 415 to the Solid State Switch and Distribution assembly 400 to activate on the corotron.

A charge is then applied to the imaging paper zinc oxide coating as shown in application Ser. No. 37,698 as the drum rotates at approximately 1 inch per second.

Charging continues until the drum revolves twice bringing pin 5 twice past the timing sensor 349, producing a signal on the 10 count line of the Decoder 353, provided through a delay 417 to the Latch Set 355 to remove the corotron "on" signal on line 413 after a suitable delay of approximately 3 seconds, corresponding to a further movement of 3 inches of paper.

At count 11, corresponding to two revolutions of the drum plus an additional movement of the drum bringing pin number 1 opposite sensor 349, a RFS signal is provided to interface 301 on line 325 by Ready for Scan Logic 417. At this point, the leading edge of the paper is approximately 1 inch past the scan gate which is located as shown in the FIG. 8c. Count 11 also sets the Scan flip flop in the Stepper Control Logic 357 and resets the drum flip flop in the Stepper Control Logic 357 to stop the drum.

At the count of 11, provided to the paper jam logic 387, vacuum switch 420 is connected to paper jam logic 387. After the 11 count, loss of vacuum will cause an enabling signal to be removed from gate 421 and from each of the gates 415, 423, 425, 427, and 429 upon detection by the vacuum switch 420 of less than full vacuum. This will occur if the paper is askew on the drum, and where some of the vacuum holes are shown in the co-pending application are not covered by the paper.

In effect, at count 11, any vacuum less than full vacuum as sensed by the vacuum switch will pull the paper jam logic line 388 low removing the enabling signal from line 421, and disabling each of the above-mentioned gates.

As shown in the accompanying time diagram, FIG. 13, responsive to a RFS signal FIG. 13C, a Scan Enable (SE) FIG. 13D signal is reflected back from the ODS indicating that the ODS is ready to provide character data to the recorder modulating driver 371. The SE signal is provided on line 305 to the Scan Enable Logic 431 which then provides a Scan signal to the Stepper Control Logic 357 on line 435 and to the Line Blanker 365 on line 437.

The Scan signal from Logic 431 is also provided on line 434 to the ramp generator 379.

Responsive to the Scan Enable signal on line 434 the Ramp generator 379 generates the proper ramp waveform to drive the galvo as explained and causes it to reciprocate driving the galvo mirror 80 and deflecting the beam from laser 74 across the paper in a raster scanning direction.

The ramp generator 379 in turn provides a Step and a Sync signal to the Step and Sync Logic 367 and to the ODS through the interface 301. Upon receiving the Sync pulse, the ODS processor delays by a predetermined amount and then transmits the SSE signal on line 309, FIG. 13F to Step and Sync Logic 367 by pulling line 309 low. Responsively, the Step and Sync Logic 367 causes Read clock 314 to generate a 530 KHz. signal derived from the 10.6 MHz. signal received from the ODS on line 313.

The 530 KHz. Read Clock then clocks the data out of the ODS buffer at the appropriate rate to video line 311 and to gate 369. The output of the gate 369 is disabled by the line blanker 365 which disables the video output line 441 until a predetermined number of sync pulses have been received.

Video is transmitted until the full page of type has been sent as indicated by the SE signal going high FIG. 13D or the occurrence of a MRR signal.

Figure 14:
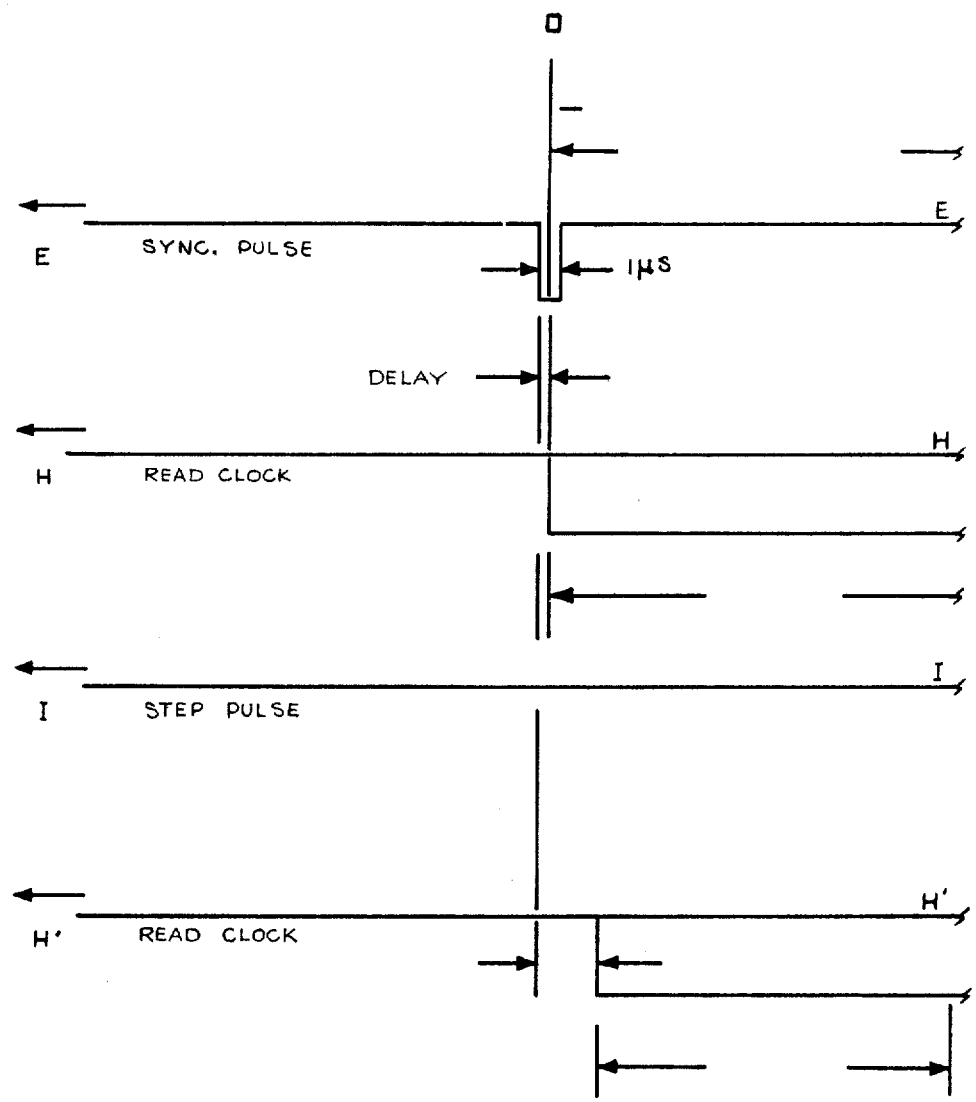
Figure 14A:
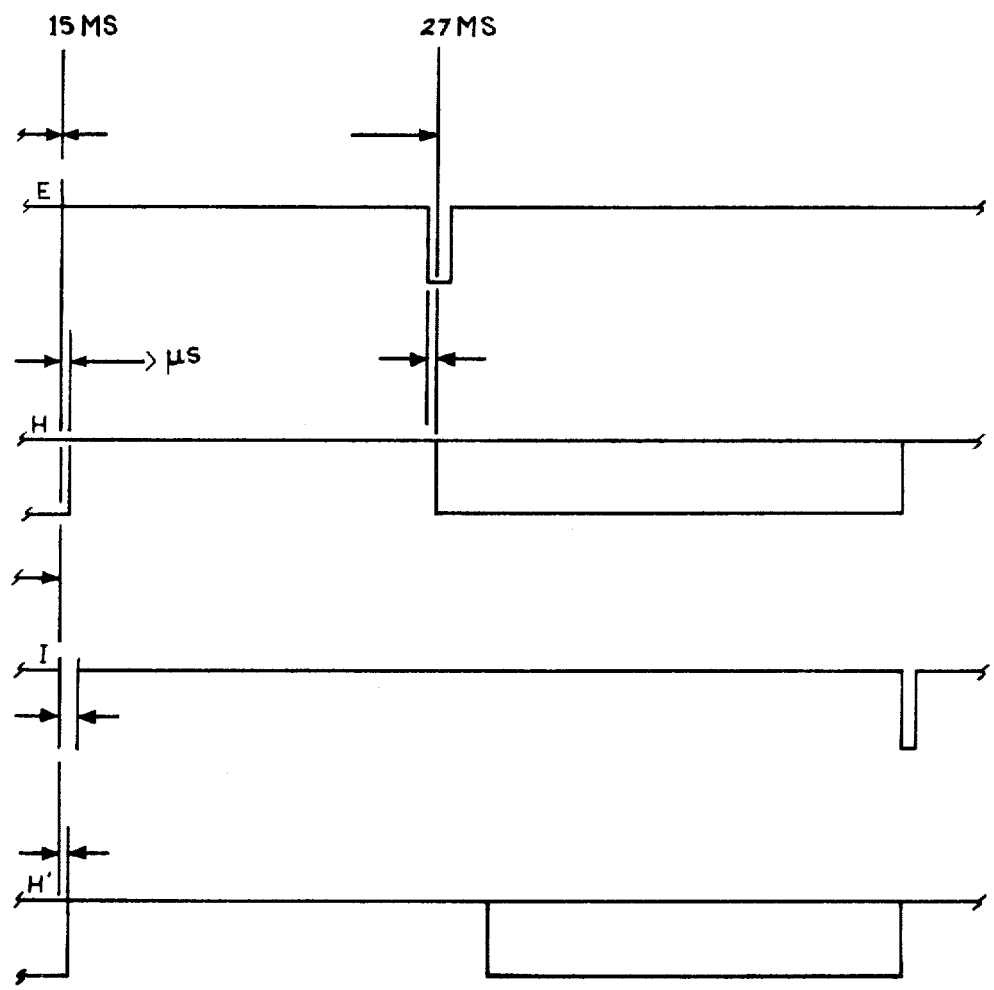

Now referring to FIG. 14, a portion of the timing diagram of FIG. 13 is shown in detail corresponding to the transmission of a line of video. As shown, the time between Sync pulses is approximately 27 milliseconds with 15 milliseconds being taken for the 11 inch scan and 12 milliseconds being required for flyback. The Sync pulse signals the start of each scan line. The read clock FIG. 13H transmits a 530 KHz. clock burst for 7953 bits for an 11 inch scan or for 6146.6 for an 8½ inch scan as shown in waveform H'.

As mentioned above, the 530 KHz. frequency burst clocks the data out of the ODS Line buffer, this data then being provided to the modulator driver 371 to modulate in the light beam as it is swept across the page by the galvo 80 under control of the ramp generator 379.

The controller is additionally made responsive to a signal from the interface 301 indicating that the line buffer data filling operation is not complete and data is not ready for transmission.

Where the line buffer is not full, upon receipt of the Sync pulse on line 323, a pulse will be reflected back by the ODS on the line 309, as shown in waveform FIG. 13F appearing 0.5 microseconds after the sync pulse.

This may be provided by the ODS in any suitable manner. As described in the copending application, Ser. No. 950,242, a flag is set when the data filling operation for a line is complete.

As previously stated, the controller signals sent to the ODS through interface 301 are reflected back to the controller in a condition indicative of the state of the ODS.

Data flags are used to signal when the data buffers in the ODS are full and the Sync Pulse sent from the controller will be reflected back on line 309 as the SSE FIG. 13F or where the data buffers are not full, as a short pulse 0.5 microseconds later after the sync pulse indicating the ODS is not prepared to transmit data.

The drum driver then steps the drum under the control of step pulse derived from to 10 MHz. master clock. An end of scan (EOS) condition is signaled by scan enable line 305 going high causing scan enable logic 431 to remove the scan signal from the stepper control logic 357 to place and end of scan EOS signal in line 432 and producing a pulse through one shot multivibrator 364 to the set terminal of the Speed-Up latch of the Stepper Control Logic 357 to send 714 Hz. to the drum stepper driver 377. This drives the drum at 1 inch per second until the driver is positioned at the prewet roller FIG. 8D. As the length of the paper is almost the full circumference of the drum, pins 1–5 are driven past the timing sensor 349 to increment the Counter and Decoder 353 from 11 to the end of scan when the SE signal goes high. The drum is then driven at one inch per second until count 16 is reached corresponding to pin number opposite the sensor 349. At that time, the Counter Decoder 353 resets the Speed Latch 353 and Sets the Toner Latch portions of the stepper control logic 357 to drive the drum at 0.25 inches per second corresponding to the divide by 12 function or divider 333. At this point, the leading edge of the drum now with the latent image on the paper is entering the prewet station as shown in FIG. 8E and proceeds through the developing station.

The count of 17 is also applied through latch set 355 to activate the prewet roller through gate 423 and the solid state switch assembly 400.

At a count of 18 corresponding to pin 3 being opposite the sensor 349, the drying fans 104 (FIG. 3) are activated through gate 425 and at a count of 18 plus a variable, the toner voltage is activated along with the toner pump through gates 427 and 429.

The variable time delay is provided by delay 426. It allows a normal machine adjustment to variations in line voltage and to the various wide tolerances that may exist in the pumps.

In this regard, a less expensive pump having a wider pumping tolerance may be used and with the pumping tolerance being adjusted by changing the adjustable time delay 426. For example, where the pumping rate is on the low side, the time delay would be decreased and when the pump rate was high, the time delay would be increased.

In the case of a varying line voltage, the delay would be decreased for a lower voltage and increased for a higher voltage.

At the count of 19, corresponding to pin number 4 being opposite to sensor 349, the stripper 86 is activated to strip the sheet from the drum. At count 19, the paper jam logic is disabled and prevented from issuing a paper jam command on line 388 responsive to the vacuum switch will now measure less than full vacuum.

The delay 426 additionally insures that the toner fluid contacts the paper within a predetermined distance from the leading edge and does not flow over the leading edge and onto the drum. By building in a delay, the toner is not applied to the paper until the angular position of the drum has brought the leading edge of the paper past the developing station. It allows the paper margin to be kept to a minimum without wasting toner fluid.

The line blanker 365 is provided to establish minimum width or margin at the top of the page, prior to printing data. It can be used to insure that a predetermined marginal will be maintained.

Paper detectors 391 and 393 are provided at the paper delivery chute 23.

The detector 393 provides a signal to the paper jam logic 387 through detector logic 389.

If a paper jam signal from detector 393 is not present at count 20, the paper jam logic will then provide a jam signal on 388 disabling gate 421 and removing the enabling signal from lines 422 and preventing the printer from operating.

If a sheet of paper at an 0 count is in the chute 23, such that it is detected by detector 391, then that signal is provided to the Ready for Load Logic element 359 which disables that element and prevents that Ready for Load (RFL) signal from being transmitted to the ODS by Ready for Load Logic 359.

In another feature of the invention, contaminated paper may be purged from the recorder. During the purge mode, as discussed with reference to FIG. 15, the ready for Scan Logic 417 is inhibited when otherwise a count 11 indicating that the drum has placed the leading edge of the paper approximately at the scanning station would provide a Ready for Scan signal to the ODS processor, and inhibits data output.

The Load Signal is applied through the Load Enable and Inhibit Logic 358 to the latching relay 346, FIG. 12. The latching relay 346 then inhibits the Load Enable and Inhibit Logic 359 from generating another load signal until a 21 count is produced at the appropriate output line of the Counter and Decoder 353. The Latching relay 346 responsive to a 21 count changes its state so another Load signal can be generated. This function prevents the loading of a second sheet of paper while a first sheet is still on the drum.

In FIG. 15, a partial detail of the stepper control logic 357 and the manner in which the drive signals to the feed stepper driver 375 and the drum stepper drive 377 are provided, during the load, scan speed-up, toning, and purge cycles are shown.

As shown, the stepper control logic 357 comprises a series of set-reset latches 503, 505, 519, 523, 525, 529, and 531. As described before upon POR & EORR all latches are restored to their initial condition.

Although not shown, it should be understood that a set condition on any of the latches 505, 519 and 525, 523, 529 and 531 will reset all of the other latches, latches 529 and 531 being operated as a pair such that both are set to enable gate 533 which in turn provides an enabling signal to and gate 535 to pass the 714 Hz. signal through to the drum stepper drive 377.

The drum latch is shown as 505. A set pulse enables gate 507 to pass the 714 Hz. signal through or gate 510, to the drum stepper drive 377.

As mentioned above, each of the other latches 519, 523, 525, and 529 are disabled by the setting of latch 505 so that only one drum drive signal can be sent through or gate 510.

During the scan cycle, scan latch 519 is set, all other aforementioned latches are reset. Scan enable Logic 431 provides an enabling pulse on line 435 and 521, to and gate 520 to pass the step pulse from the ramp generator 379 to the drum stepper drive 377.

The step pulse is provided at the flyback time of the ramp. This provides sufficient time for the drum to be advanced before the occurrence of the next sync pulse.

End of scan Latch 523 is set by an end of scan indication on line 432 after the SE signal has gone high or an MMR signal is received, indicating the data transmission for that page has been completed. At this point, the drum is advanced quickly through to the developing cycle, by applying a 714 Hz. signal through and gate 526, through or gate 510 to the drum stepper drive 377.

After the drum has advanced the leading edge of the paper is approximately opposite the prewet roller, FIG. 8D an appropriate count causes toning latch 525 to be set, enabling gate 527 to pass a 178 Hz. signal through or gate 510 to the drum stepper drive 377 advancing the drum at 0.25 inches per second. As mentioned before, the various drum stepper frequency drive signals are provided from a 1429 Hz. clock to divider 334 which provides a divide by 2, divide by 8, divide by 12 and divide by 40 functions.

The occurrence of a purge signal from the Purge push bottom 392 and the occurrence of a home signal from the load enabling and inhibit logic 358 provides a set signal to the inhibit latch 531. The output of the inhibit latch disables and gate 421 preventing the corotron, the prewet roller, the fans, the toner, the toner pumps, and the strippers from operating during the purge cycle.

A 714 Hz. drive signal is then applied through and gate 535 to or gate 510 upon the enabling of gate 533 by purge latch 529 and inhibit latch 531. The drum is then driven at one inch per second through the remaining cycles discharging the paper, and purging the machine for the next recording cycle.

A return to zero switch 390, provides a signal to the latching relay 346 and to the return to zero logic 344.

It's used to restart after power has been lost or a paper jam was experienced and the machine must be returned to zero to initialize a successive run.

Responsive to the return to zero signal from control 390, the latching relay 346 is reset, and the return to zero logic 344 responsive to the signal from switch 390 is activated to return the drum to its zero position as previously explained.

We claim:

1. An electrophotographic typesetting system having a raster scanning means including means for directing a beam of modulated radiation across an imaging surface, means for providing relative motion between said beam and an imaging surface to produce a succession of raster lines, and forming a plurality of characters on said surface, including means for providing first digital data defining the identity and location of characters, font storage means providing second digital data defining the contour of a plurality of characters with respect to a normalized encoded set of first and second coordinates, data processing means connected to said first and second digital data for producing third digital data defining the character boundaries intersecting a raster line, means for modulating said beam to change the state of the beam from a first state to a second state at a first intersection and to reverse the state of the beam at a successive intersection, forming said characters on said surface, said data processing means including a raster line store for storing said third digital data, and a controller for controlling at least a part of said system and having means for interrogating said raster line store and inhibiting said data processing means from transmitting said third digital data in response to an incompletely filled line store.

2. The system of claim 1, wherein said controller includes a master timing means, said master timing means including means for controlling the beam directing means for providing relative motion between said beam and said imaging surface.

3. The system of claim 2, wherein said master timing means includes means for controlling the transmission of said third digital data.

4. The system of claim 1, wherein said controller includes a master timing means for controlling the transmission of said third digital data.

5. The system of claim 4, wherein said means for directing said beam of light includes means responsive to said master timing means for moving said beam across said imaging surface, synchronized with the said third digital data transmission.

6. The system of claim 5, wherein said master timing means includes means to produce a control signal and with said beam directing means being responsive to said control signal.

7. The system of claim 6, wherein said means to control said third digital data transmission includes means responsive to said control signal for indicating an incompletely filled store and for inhibiting said data transmission.

8. The system of claim 6 wherein said control signal is a ramp and said control signal means including means for producing a sync signal at a predetermined phase and amplitude of said ramp, said beam directing means being responsive to said sync signal, said sync signal means having one input connected to said ramp signal and to a means for reducing the effect of extraneous signals on said sync signal means whereby the third digital data transmission may be initiated with reference to said sync signal and synchronized with said beam directing means.

9. The system of claim 8, wherein said ramp includes a flyback period and said means providing relative movement between said beam and said imaging surface being responsive to said flyback period of said ramp.

10. The system of claim 6, wherein said beam directing means has a tolerance range, said control signal causes said beam directing means to sweep the beam in a scan locus, said means for developing said control signal includes fixed and variable means, said variable means being substantially limited to vary the beam sweep within the tolerance range of said beam directing means, for setting the extent of said scan locus while reducing the effect on said beam directing means of any change in said variable means.

11. The system of claim 10, wherein said means for developing said control signal is a ramp generator, said fixed and variable means being fixed and variable resistances for controlling the amplitude of said ramp, and said variable resistance being set to produce a ramp directing said beam sweep to a predetermined point in said sweep range.

12. The system of claim 10, wherein said beam directing means includes means to provide a feedback position signal and means to adjust said position signal for a predetermined scan locus and summing means connected to the ramp signal and to said position signal for producing a drive signal to drive said beam directing means, adjusting means and said calibrating the feedback position signal to said ramp signal.

13. An electrophotographic typesetting reproducing system having means for directing a beam of modulated light in a raster scan across an imaging surface to form a latent image, means for supporting and driving an imaging surface through a plurality of cycles, said image surface support means including position means for indicating the position of said image surface support means, said reproducing system having charging, imaging and developing stations placed adjacent said imaging surface and a controller having means responsive to said position means for selectively activating and inactivating said stations.

14. The system of claim 13, wherein means for driving includes means for driving said image surface support in at least a plurality of rates, a first rate and a second rate, said first rate being slower than the said second rate for developing a latent image, said controller having means for purging an undesired imaging surface from said reproducing means, said means for driving being connected to and responsive to said means for purging and driving said image surface support through said reproducing system, at said second rate, and said controller including means for deactivating said stations responsive to said means for purging.

15. The system of claim 13, wherein said imaging surface has a leading edge, one side of the imaging surface being adjacent the developing means and an opposite side of the imaging surface facing away from said developing means, and said controller having timing means activating said developing means to prevent said toner from contacting the said opposite side.

16. The system of claim 15, wherein said developing station includes means for providing developer to said surface, said control means having adjustable timing means for correlating the rate said developing means provides said developer to said surface with the said position of said leading edge.

17. The system of claim 13, wherein said image surface support is a drum, said positioning means being located on said drum and radially displaced about the axis of rotation of said drum.

18. The system of claim 17, wherein said positioning means are pins including a first set of a plurality of pins corresponding to the said stations and a home position pin, and said first set of pins and said home pin being at different radial distances from said axis.

19. The system of claim 13, wherein said positioning means are located on said image surface support means and related to the said charging, imaging, and developing stations.

20. The system of claim 13, wherein said controller drives said image surface support means at a first rate and a second rate, said light beam being modulated responsive to a data stream transmission containing character information, said first rate being related to the said transmission rate between successive raster lines, said controller driving said image surface support means at said second rate responsive to the end of said data stream.

21. The system of claim 13, wherein said reproducing system includes a supply means for said imaging surface, means to separate discrete lengths of said image surface from said supply, and means to advance said image surface from said supply to said image surface support means responsive to an advance signal from said controller, said support means including means to hold said surface responsive to a signal from said controller, said controller transmitting a drive signal to said support means and deactivating said advance signal whereby said imaging surface is withdrawn from said supply by said support means, and said controller deactivating said drive signal to said support means, and providing said advance signal for a predetermined time period to clamp said imaging surface while providing a signal to said separating means to separate a predetermined length of said surface, said surface being stationary during said predetermined time period whereby said surface may be cut on the fly.

22. The system of claim 21, wherein said advancing means is a step drive.

23. The system of claim 13, wherein said system includes a data processing means, said means for directing said modulated light beam is connected to the said data processing means providing a stream of data, and includes means connected to said data for modulating said light beam, said controller driving said image surface support means at a first rate for imaging said modulated light beam on said imaging surface responsive to the presence of data transmitted to said beam modulator and responsive to the end of said data for driving said support means at a second rate, said second rate being faster than said first rate.

24. The system of claim 23, wherein, said data processing means including means to store first digital data defining the identity and location of characters for a predetermined length of said imaging surface, said data stream having an intended start point and an intended end point on said predetermined length, said data processing means including means to provide a signal indicative of the termination of said data stream between said intended start and end points and prior to said intended end point, said controller driving said image surface support means at said second rate in response to said termination signal.

25. The system of claim 23, including master timing means to provide a signal to said data processing means for initiating the transmission of said data.

26. The system of claim 25, wherein said controller drives said image surface support responsive to said master timing signal.

27. An electrophotographic typesetting system having means for forming a plurality of characters on an imaging surface, and including a raster scanning means having beam directing means for directing a beam of modulated radiation across said imaging surface, means for providing relative motion between said beam and said imaging surface to produce a succession of raster lines,
including means for providing first digital data defining the identity and location of characters, font storage means providing second digital data defining a plurality of characters with respect to a normalized encoded set of first and second coordinates, data processing means connected to said first and said second digital data for producing third digital data defining the character boundaries intersecting a raster line, means for modulating said beam responsive to said third digital data to change the state of the beam from a first state to a second state at a first intersection and to reverse the state of the beam at a successive intersection, forming said characters on said surface, said data processing means including a raster line store for storing said third digital data, and including a controller, said controller including a master timing means, said master timing means providing a timing signal for controlling, the transmission of said third digital data to the said modulating means and the raster scanning means.

28. The system of claim 27, wherein said master timing means provides a timing signal for controlling the said means for providing relative motion between said beam and said imaging surface.

29. The system of claim 27, wherein said master timing means controls the transmission of said third digital data, said beam directing means includes means for developing a control signal, and means responsive to said control signal for moving said beam across said imaging surface, and said control signal means being connected to said master timing means for synchronizing the movement of the beam with the said third digital data transmission.

30. The system of claim 29, wherein said control signal is a ramp, and said control signal means includes means responsive to said ramp phase for controlling the transmission of said third digital data.

31. The system of claim 30, wherein said means responsive to said ramp for controlling said third digital data transmission rate includes means for producing a sync signal at a predetermined phase and amplitude of said ramp, a reference signal means, said sync signal means having one input connected to said ramp signal and a second input connected to said reference signal, and means connected to said first and second inputs for reducing the effect of extraneous signals on said sync signal means whereby the third digital data transmission may be initiated with reference to said ramp phase and amplitude, and synchronized with said beam directing means.

32. The system of claim 30, wherein said ramp includes a flyback period and including means responsive to said flyback period for controlling the means providing relative movement between said beam and said imaging surface.

33. The system of claim 30, wherein said control signal causes said beam directing means to sweep the beam in a scan locus, said means for developing said control signal includes fixed and variable means, said variable means being substantially limited for varying the sweep over a beam sweep tolerance range reducing the effect on said beam directing means of any change in said variable means.

34. An electrophotographic typesetting system having a raster scanning means including means for directing a beam of modulated radiation across an imaging surface, means for supporting an imaging surface, means for providing relative motion between said beam and said imaging surface support to produce a succession of raster lines, and forming a plurality of characters on said surface,
including means for providing first digital data defining the identity and location of characters, font storage means providing second digital data defining a plurality of characters with respect to a normalized encoded set of first and second coordinates, data processing means connected to said first and second digital data for producing third digital data defining the character boundaries intersecting a raster line, means for modulating said beam responsive to said third digital data to change the state of the beam from the first state to a second state at a first intersection and to reverse the state of the beam at a successive intersection forming said characters on said surface, said data processing means including a raster line store for storing said third digital data, and including a controller, said scanning means including drive means for driving said imaging surface support means through a plurality of cycles to form said typeset characters, said controller providing timed control signals to said driving means to drive said support means through its said plurality of cycles, said imaging surface support means, including positioning means for indicating the position of said imaging surface support means, said system having charging, imaging, and developing stations placed adjacent said imaging surface support means and said controller having means responsive to said positioning means for selectively timing the activating and inactivating of said stations.

35. The system of claim 34, wherein means for driving includes means for driving said imaging surface support means in at least a plurality of rates, a first rate and a second rate, said first rate being slower than the said second rate for developing a latent image and means for purging an undesired imaging surface from said reproducing means, said means for driving being connected to and responsive to said means for purging and driving said imaging surface through said reproducing means, at said second rate and deactivating said stations.

36. The system of claim 35, said imaging surface has a leading edge, one side of the imaging surface being adjacent the developing means and an opposite side of the imaging surface facing away from said developing means, and said controller responsive to said positioning means activating said developing means when the portion of said leading edge has past said developing means to prevent said toner from contacting the said opposite side.

37. The system of claim 36, wherein said positioning means includes pins, said imaging surface support means includes a drum rotatably mounted, said pins being located on said drum and radially displaced about the axis of rotation of said drum.

38. The system of claim 37, wherein said pins include a first set of a plurality of pins corresponding to the said stations and a home position pin, and said first set of pins and said home pin being at different radial distances from said drum axis.

39. The system of claim 34, wherein said positioning means includes a first set of timing pins located on said imaging surface support means and corresponding to the said charging, imaging, and developing stations.

40. The system of claim 39, wherein said controller drives said imaging surface support means at a first rate and at a second rate, said light beam being modulated responsive to a data stream containing character information, said first rate being related to the transmission rate between successive raster lines, said controller driving said image support surface at said second rate responsive to the end of said data stream for said imaging surface.

41. The system of claim 40, wherein said means for directing said modulated light beam is connected to said data processing system for providing a stream of data and includes means connected to said data for modulating said light beam, said controller driving said image support means at a first rate for imaging said modulated light beam on said surface responsive to the presence of data transmitted to said beam modulator and responsive to end of said data for driving said support means at a second rate, said second rate being faster than said first rate.

42. The system of claim 41, wherein said data processing means including means to store first digital data defining the identity and location of characters for a predetermined length of said imaging surface, said data stream having an intended start point and an intended end point for said predetermined length of said surface and including means to provide a signal indicative of the termination of said data stream between said intended start and end points prior to said end intended point, said controller driving said image support means at said second rate in response to said termination signal.

43. The system of claim 34, wherein said developing means includes means for providing developer to said surface, said imaging surface having a leading edge, said controller having adjustable means for correlating the rate said developing means provides said developer to said surface with the said position of said leading edge.

44. The system of claim 34, wherein said controller includes blanking means for inhibiting said modulating means for modulating the said beam responsive to the occurrence of a predetermined number of raster lines.

45. The system of claim 44, wherein said blanking means is connected to said controller timing means for receiving a sync signal indicative of a raster line, said blanking means including means for inhibiting said modulating means responsive to a predetermined number of sync signals.

46. The system of claim 45, wherein said beam is a laser beam.

47. The system of claim 46, wherein said raster scanning means includes a galvo mounted mirror in the path of said beam, said galvo mirror sweeping said beam in a scan locus.

* * * * *